United States Patent
Fukuda et al.

(10) Patent No.: US 8,881,196 B2
(45) Date of Patent: Nov. 4, 2014

(54) VIDEO PLAYBACK APPARATUS, INFORMATION PROVIDING APPARATUS, INFORMATION PROVIDING SYSTEM, INFORMATION PROVIDING METHOD AND PROGRAM

(75) Inventors: Kazuhiro Fukuda, Kanagawa (JP); Tetsuo Maruyama, Tokyo (JP); Asako Honjo, Tokyo (JP)

(73) Assignee: Sony Corporation, Tokyo (JP)

( * ) Notice: Subject to any disclaimer, the term of this patent is extended or adjusted under 35 U.S.C. 154(b) by 1509 days.

(21) Appl. No.: 12/187,505

(22) Filed: Aug. 7, 2008

(65) Prior Publication Data

US 2009/0044238 A1 Feb. 12, 2009

(30) Foreign Application Priority Data

Aug. 8, 2007 (JP) ................. P2007-207123

(51) Int. Cl.
*H04N 5/445* (2011.01)
*H04N 7/173* (2011.01)
*G06F 3/00* (2006.01)
*G06F 13/00* (2006.01)
(Continued)

(52) U.S. Cl.
CPC ............ *H04N 9/8715* (2013.01); *G11B 27/034* (2013.01); *H04N 9/8205* (2013.01); *G06Q 30/00* (2013.01); *H04N 21/4312* (2013.01); *G11B 27/105* (2013.01); *G11B 27/329* (2013.01); *H04N 21/482* (2013.01); *G11B 27/11* (2013.01); *H04N 21/4314* (2013.01); *H04N 21/4325* (2013.01); *H04N 21/6582* (2013.01); *H04N 21/84* (2013.01)
USPC ............. 725/40; 725/51; 725/53; 725/110; 725/120

(58) Field of Classification Search
None
See application file for complete search history.

(56) References Cited

U.S. PATENT DOCUMENTS

2003/0093790 A1* 5/2003 Logan et al. ............ 725/38
2005/0193408 A1* 9/2005 Sull et al. ................ 725/32
(Continued)

FOREIGN PATENT DOCUMENTS

EP          1 732 005 A1    12/2006
JP          2001-292424     10/2001
(Continued)

OTHER PUBLICATIONS

European Search Report from European Patent Office dated Feb. 20, 2009 for Application No. 08252612.0-1241, 3 pages.

*Primary Examiner* — Nasser Goodarzi
*Assistant Examiner* — Fred Peng
(74) *Attorney, Agent, or Firm* — Finnegan, Henderson, Farabow, Garrett & Dunner, L.L.P.

(57) ABSTRACT

A video playback apparatus for playing back a recorded program video which is connected with an ECG server for providing information related to a program through a communication network includes a designation information transmitting portion to transmit designation information designating a program containing a specific recorded program video to the ECG server, a related information receiving portion to receive a related information associated with the designated program, which is selected from related information each containing an ECG scenario related to each program video constituting a program and a scheduled time of each program video and stored in association with the program, from the ECG server, and a display/playback control portion to control display of the ECG scenario related to the specific program video in synchronization with playback of the specific program video based on the scheduled time of the program video.

16 Claims, 22 Drawing Sheets

(51) Int. Cl.
*G11B 27/034* (2006.01)
*H04N 9/82* (2006.01)
*G06Q 30/00* (2012.01)
*H04N 9/87* (2006.01)
*H04N 21/431* (2011.01)
*G11B 27/10* (2006.01)
*G11B 27/32* (2006.01)
*H04N 21/482* (2011.01)
*G11B 27/11* (2006.01)
*H04N 21/432* (2011.01)
*H04N 21/658* (2011.01)
*H04N 21/84* (2011.01)

(56) References Cited

U.S. PATENT DOCUMENTS

2007/0050809 A1 3/2007 Pharn
2007/0300258 A1* 12/2007 O'Connor et al. .............. 725/44
2008/0036917 A1* 2/2008 Pascarella et al. ............ 348/702
2009/0276817 A1* 11/2009 Colter et al. .................... 725/88

FOREIGN PATENT DOCUMENTS

| | | |
|---|---|---|
| JP | 2002-262268 | 9/2002 |
| JP | 2003-203035 | 7/2003 |
| JP | 2004-193681 | 7/2004 |
| JP | 2004-304405 | 10/2004 |
| JP | 2005-176218 | 6/2005 |
| JP | 2005-204233 | 7/2005 |
| JP | 2006-221693 | 8/2006 |
| JP | 2007-060496 | 3/2007 |
| JP | 2007-104313 | 4/2007 |

* cited by examiner

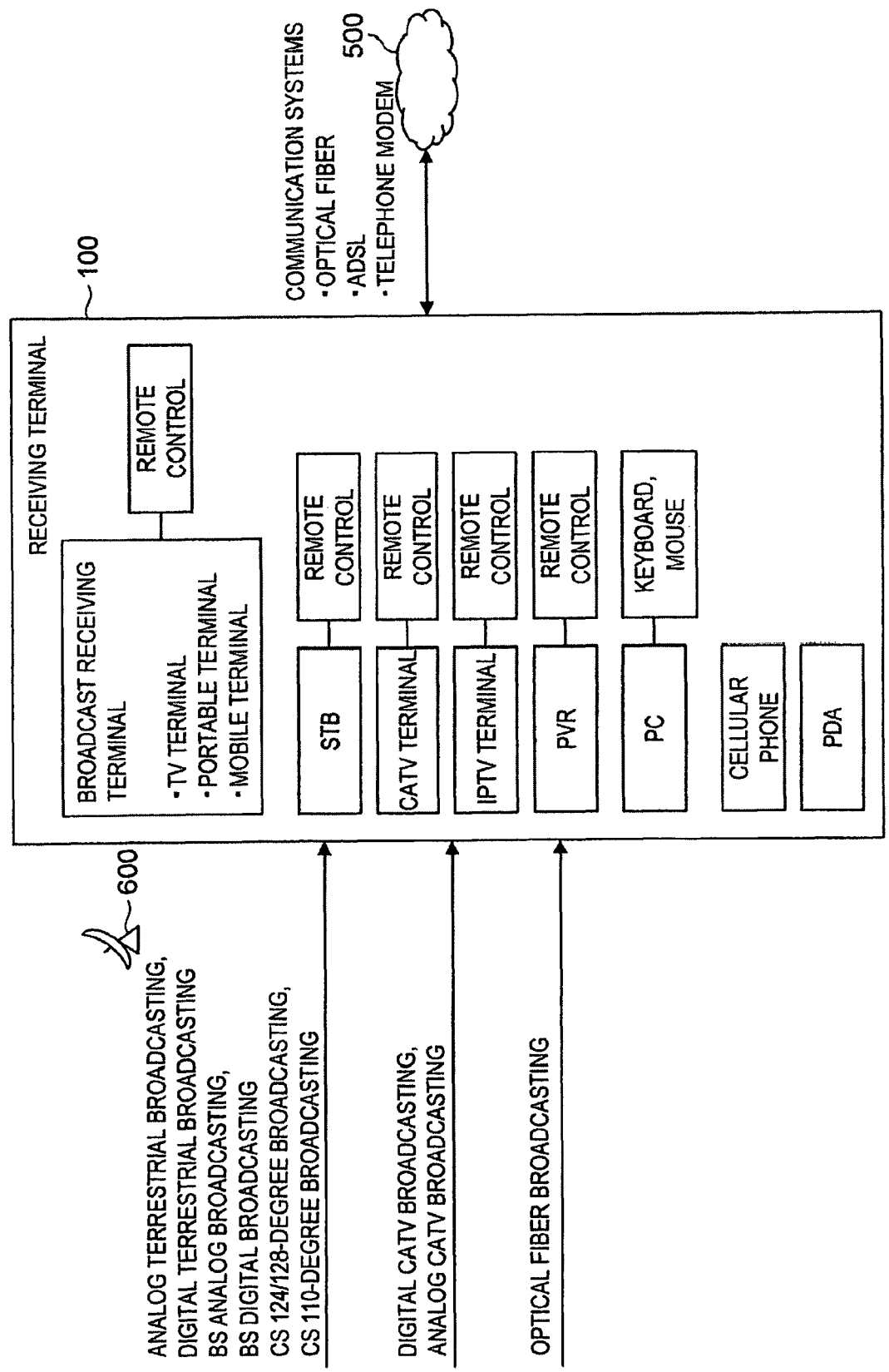

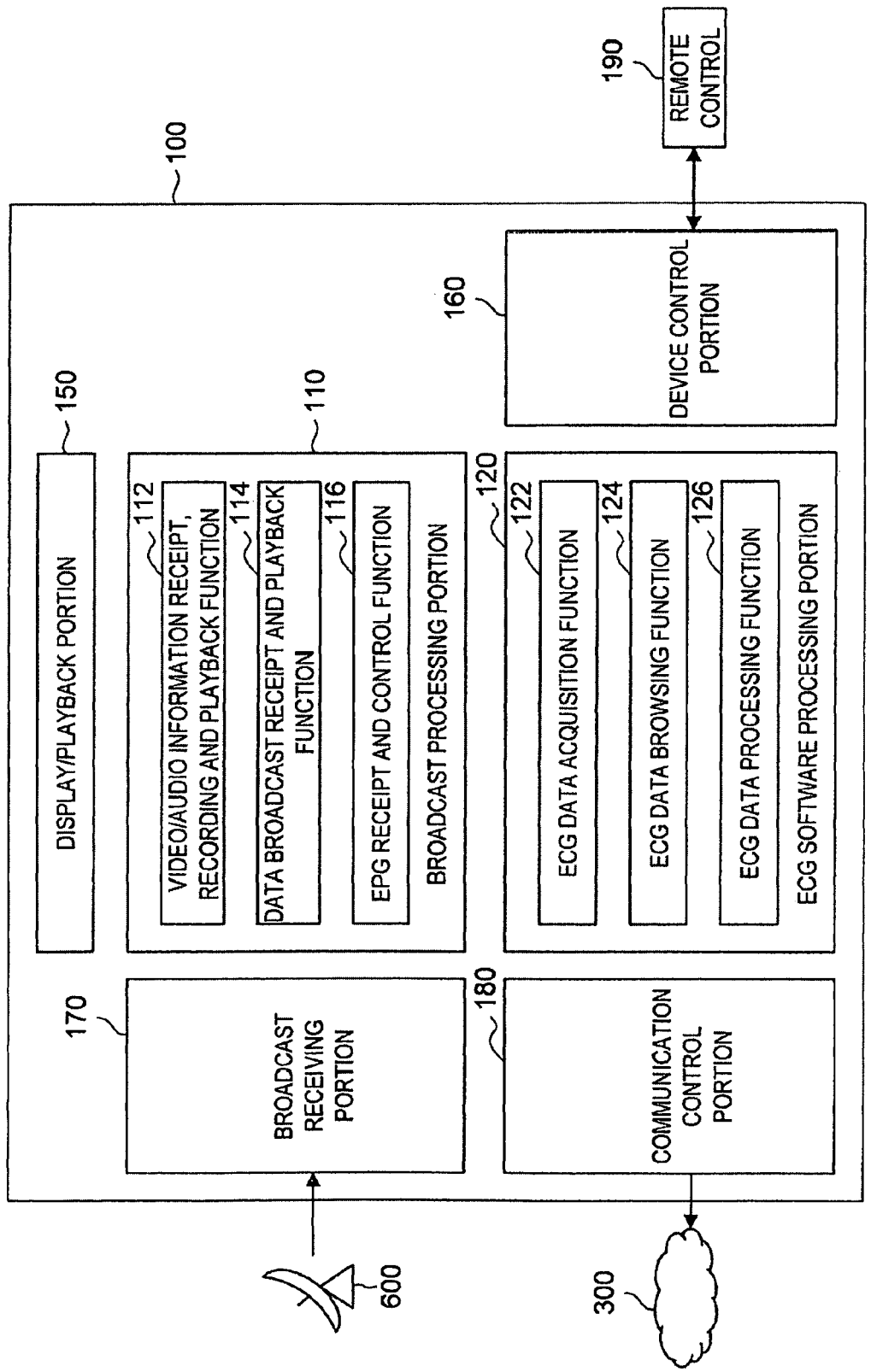

FIG.7A

```
<program id="P00001" name="PROFESSIONAL STYLE" genre="DOCUMENTARY" keywords="AAA BBB KNOW-HOW IMPRESSION" relation_ref ="sc00001" >
    <oa start_date="2007/7/10" end_date="2007/7/10" start_time="22:00:00" end_time="23:00:00">
        <details>
            <CreditsList>
                <Person id="1_1" name="AAA"  Birthplace="Japan"/>
                <Person id="1_2" name="BBB"  Birthplace="Japan"/>
                <Person id="1_3" name="CCC"  Birthplace="Japan"/>
            </CreditsList>
        </details>
    </oa>
    <chaper_list id="ch_l_001" version="1.0">
        <chapter id="1" name="CHAPTER 1" start_time"00:00:00" duration="00:15:00" keywords="AAA DDD" relation_ref="ch001">
        <chapter id="2" name="CHAPTER 2" start_time"00:15:00" duration="00:15:00" keywords="CCC" relation_ref="ch002">
        <chapter id="3" name="CHAPTER 3" start_time"00:30:00" duration="00:15:00" keywords="BBB" relation_ref="ch003">
    </chapter_list>
    <digest_list id="d_l_001" version="1.0">
        <digest id="1" name="DIGEST 1" start_time"00:00:00" duration="00:15:00" keywords="AAA DDD" relation_ref="d001">
            <time_list start_time"00:10:00" duration="00:10:00" keywords="AAA DDD" />
            <time_list start_time"00:30:00" duration="00:5:00" keywords="AAA DDD" />
        </digest>
    </digest_list>
</program>
```

FIG.7B

```
<content id="C00001" name="PRODUCT 1" genre="PUBLICATION" keywords="XXX YYY ZZZ" maker="zony" price="100 YEN" content_info="www.zony.co.jp" />
```

FIG.8A

```xml
<ecg_scenario id="sc0011" name="ECG SCENARIO (PROGRAM)" start_date="2007/7/1" start_time="00:00:00" end_date="2007/7/20" end_time="00:00:00" memo="BROADCAST TIME 2007/7/10 10PM TO 11PM" >
    <ecg_set_content id="ecg_set_c1" ecg_set_id="es00001" />
    <ecg_set_content id="ecg_set_c2" ecg_set_id="es00002" />
</ecg_scenario>
```

FIG.8B

```xml
<ecg_set id="es00001" name="ECG SET 1" start_date="2007/7/1" start_time="00:00:00" end_date="2007/7/20" end_time="00:00:00" >
    <content id="c11" type="program" program_id="P011" start_date="2007/7/10" start_time="22:00:00" end_date="2007/7/10" end_time="23:00:00" />
    <content id="c12" type="program" program_id="P012" start_date="2007/7/10" start_time="22:00:00" end_date="2007/7/10" end_time="23:00:00" />
    <content id="c13" type="program" program_id="P013" start_date="2007/7/1" start_time="00:00:00" end_date="2007/7/20" end_time="00:00:00" />
    <content id="c14" type="product" content_id="C011" start_date="2007/7/1" start_time="00:00:00" end_date="2007/7/20" end_time="00:00:00" />
</ecg_set>
```

FIG.8C

```xml
<ecg_set id="es00002" name="ECG SET 2" start_date="2007/7/1" start_time="00:00:00" end_date="2007/7/20" end_time="00:00:00" >
    <content id="c21" type="program" program_id="P021" start_date="2007/7/10" start_time="22:00:00" end_date="2007/7/10" end_time="23:00:00" />
    <content id="c22" type="program" program_id="P022" start_date="2007/7/10" start_time="22:00:00" end_date="2007/7/10" end_time="23:00:00" />
    <content id="c23" type="product" content_id="C021" start_date="2007/7/1" start_time="00:00:00" end_date="2007/7/20" end_time="00:00:00" />
</ecg_set>
```

FIG.9A

```
<ecg_scenario id="ch001" name="ECG SCENARIO (CHAPTER 1)" memo="PLAYBACK CHAPTER 1 OF RECORDED PROGRAM" >
    <ecg_set_content id="ecg_set_c1" ecg_set_id="es0000c1" />
</ecg_scenario>
```

FIG.9B

```
<ecg_set id="es0000c1" name="ECG SET C1" start_date="2007/7/1" start_time="00:00:00" end_date=2007/7/20" end_time="00:00:00" >
    <content id="c1-1" type="program" program_id="P0c11" start_date="2007/7/1" start_time="00:00:00" end_date=2007/7/20" end_time="00:00:00"/>
    <content id="c1-2" type="product" content_id="C0c11" start_date="2007/7/1" start_time="00:00:00" end_date=2007/7/20" end_time="00:00:00"/>
    <content id="c1-3" type="product" content_id="C0c12" start_date="2007/7/1" start_time="00:00:00" end_date=2007/7/20" end_time="00:00:00"/>
</ecg_set>
```

FIG.9C

```
<ecg_scenario id="d001" name="ECG SCENARIO (DIGEST 1)" memo="PLAYBACK DIGEST 1 OF RECORDED PROGRAM" >
    <ecg_set_content id="ecg_set_d1" ecg_set_id="es0000d1" />
</ecg_scenario>
```

FIG.9D

```
<ecg_set id="es0000d1" name="ECG SET D1" start_date="2007/7/1" start_time="00:00:00" end_date=2007/7/20" end_time="00:00:00" >
    <content id="d1-1" type="program" program_id="P0d11" start_date="2007/7/1" start_time="00:00:00" end_date=2007/7/20" end_time="00:00:00"/>
    <content id="d1-2" type="product" content_id="C0d11" start_date="2007/7/1" start_time="00:00:00" end_date=2007/7/20" end_time="00:00:00"/>
    <content id="d1-3" type="product" content_id="C0d12" start_date="2007/7/1" start_time="00:00:00" end_date=2007/7/20" end_time="00:00:00"/>
</ecg_set>
```

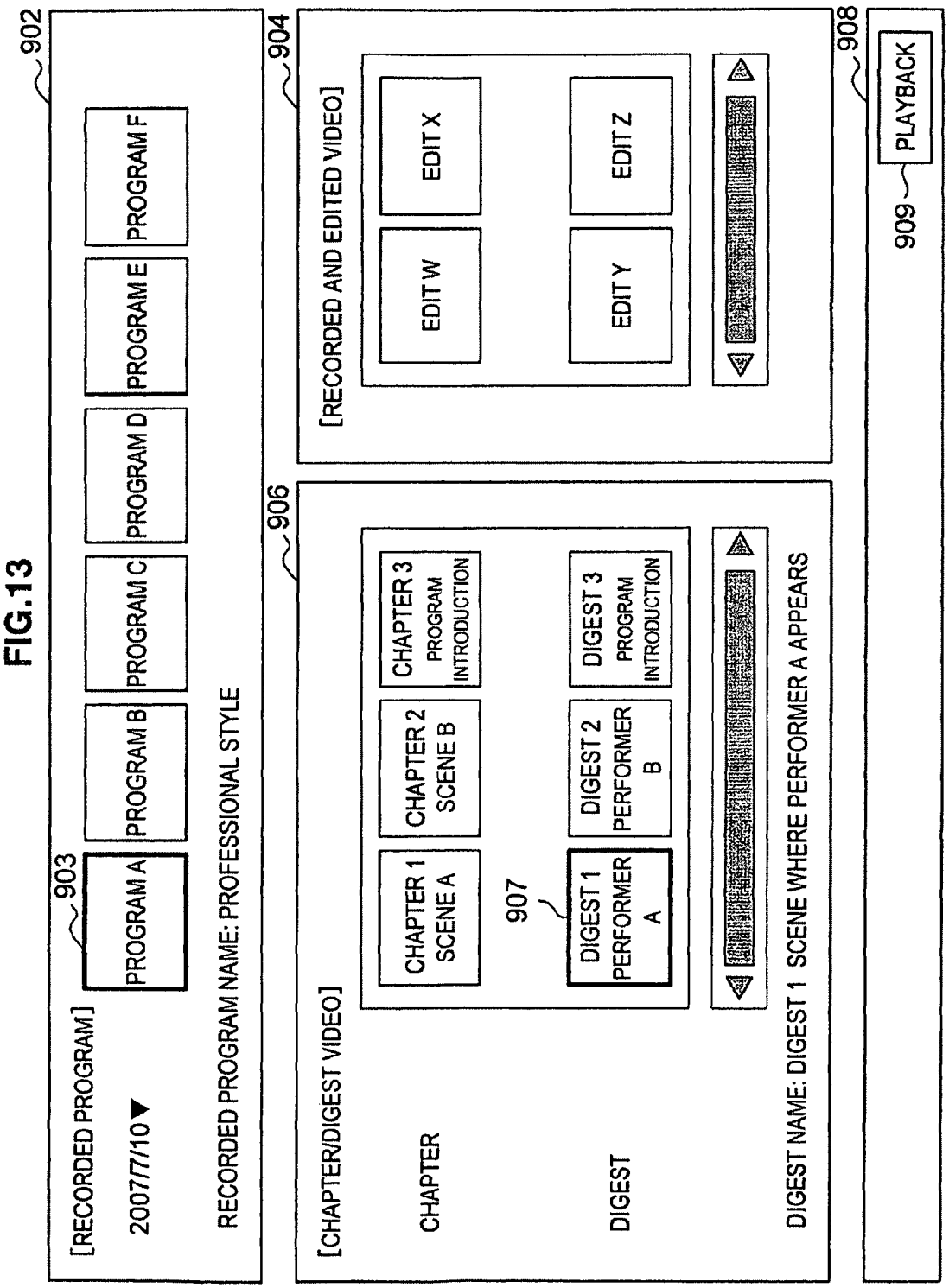

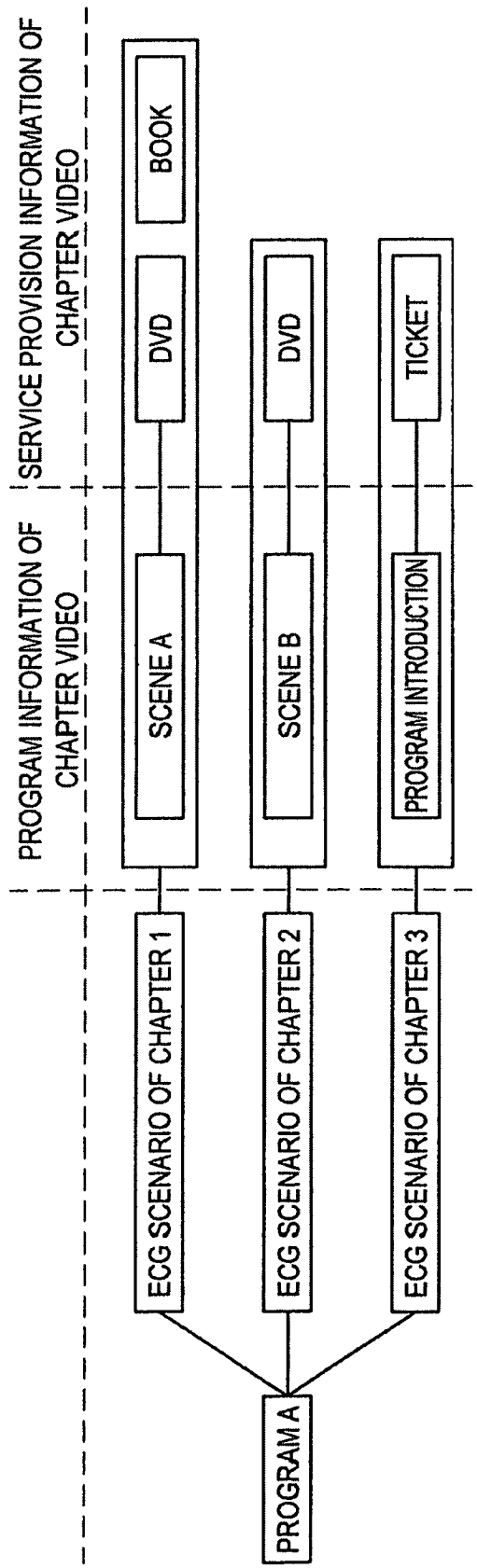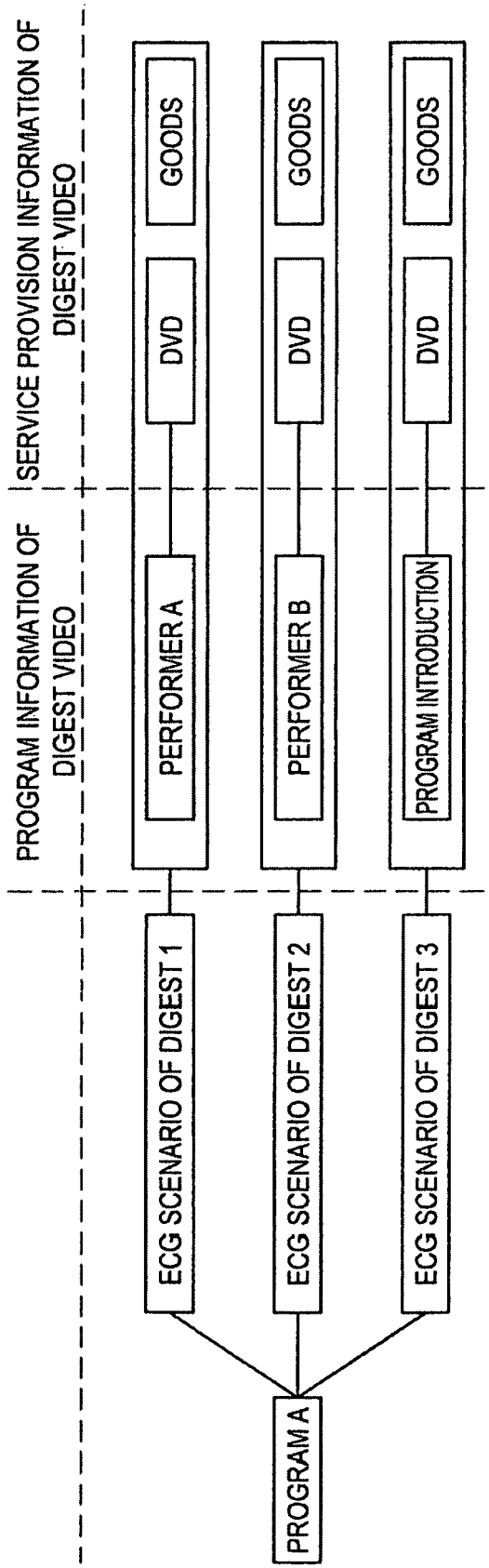

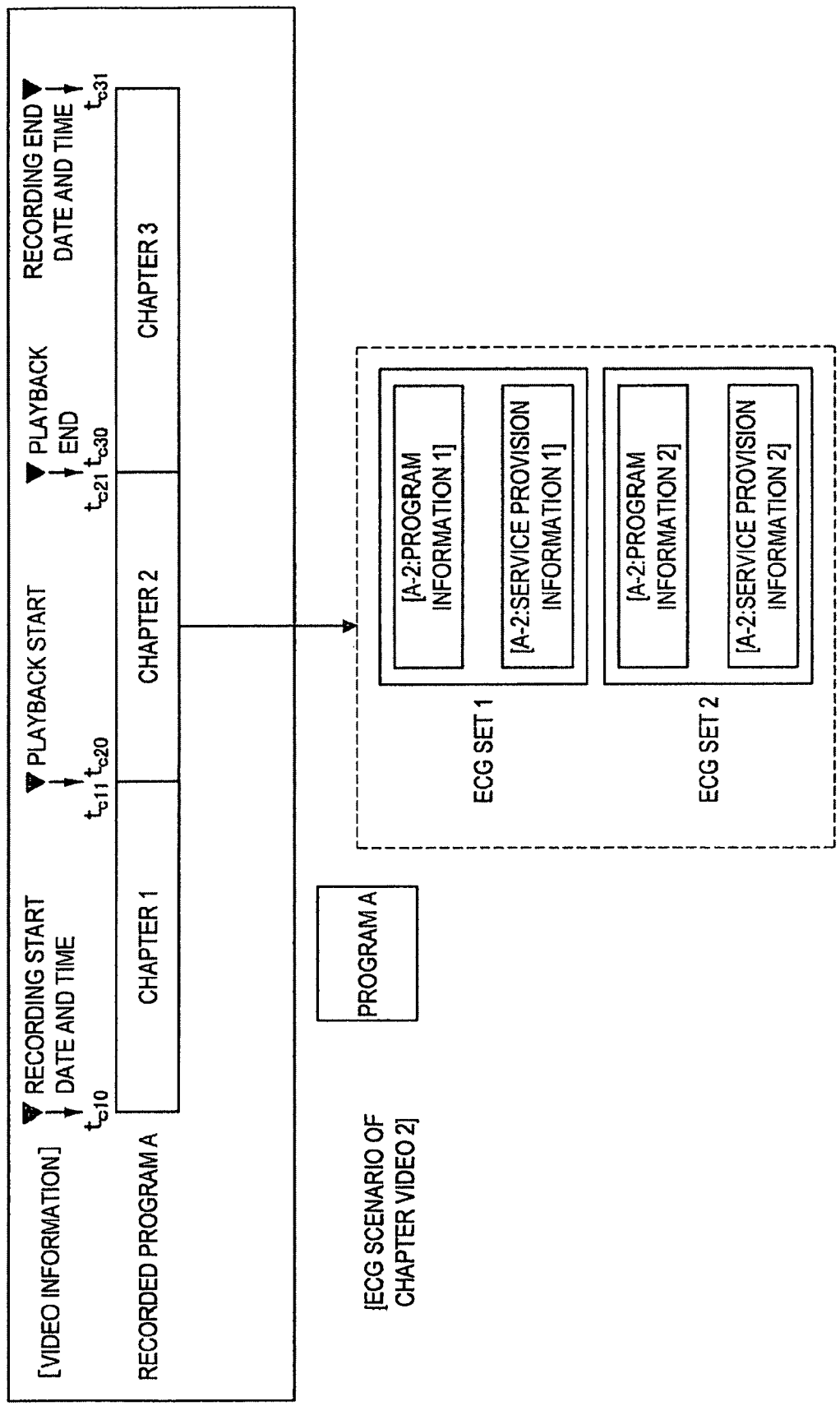

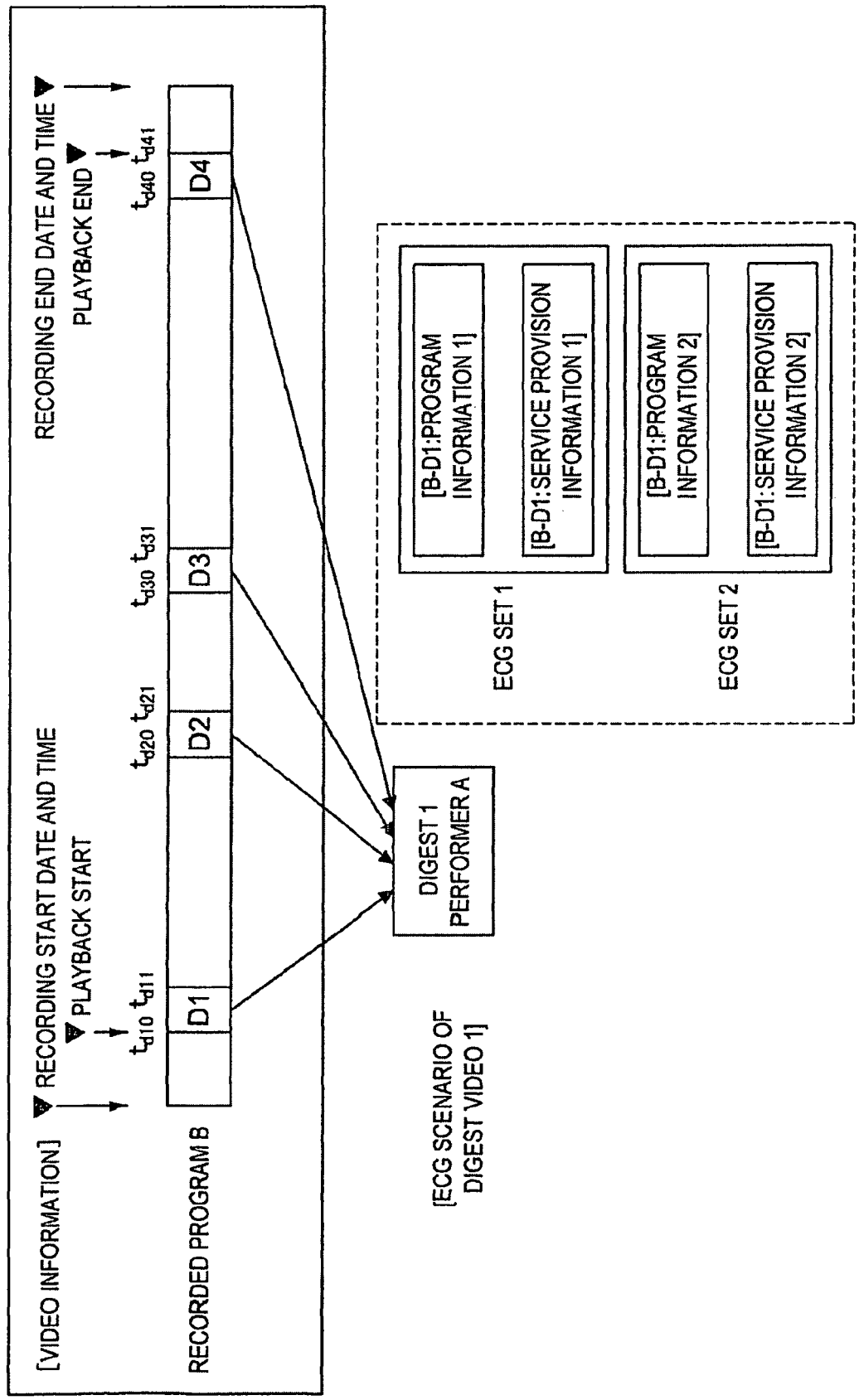

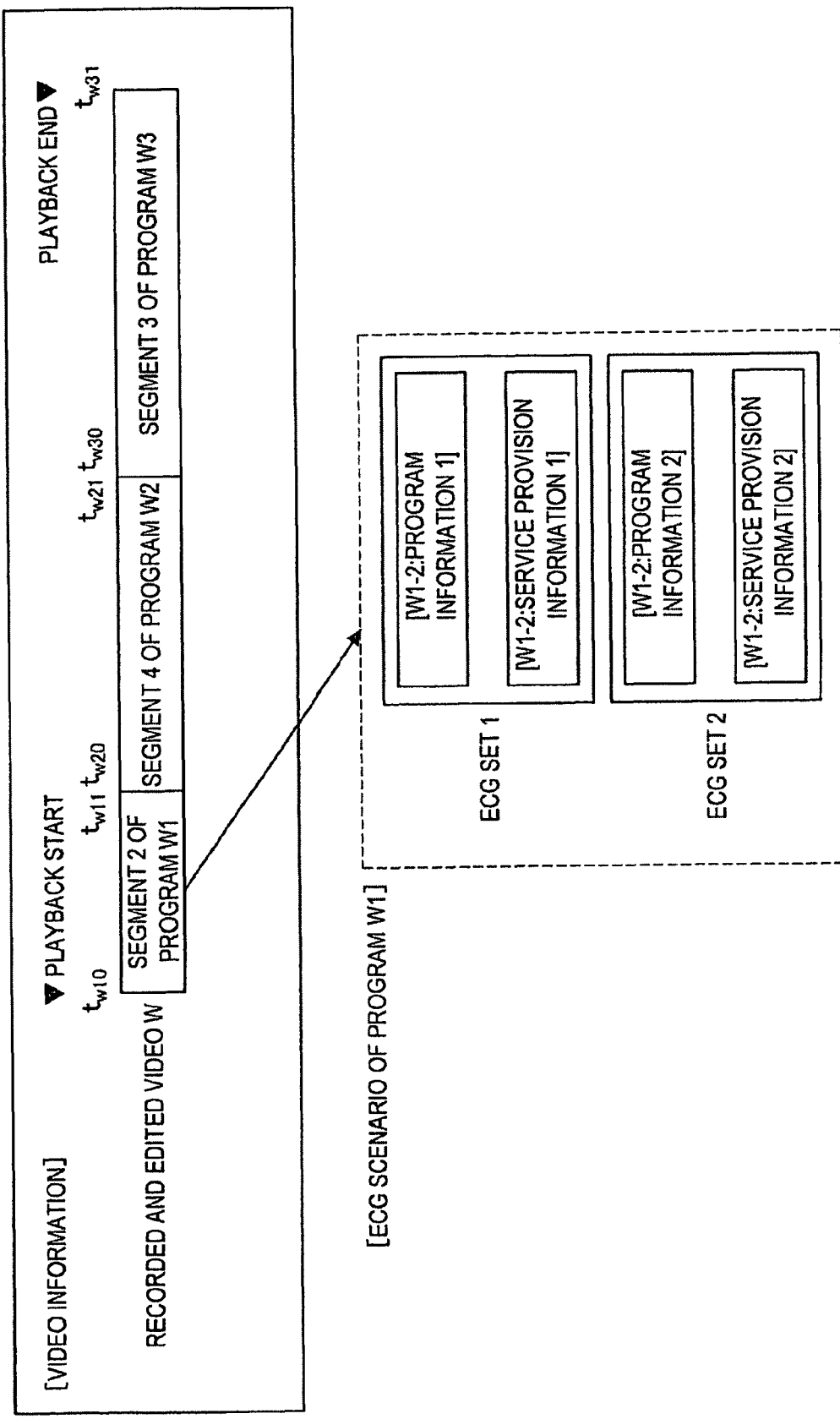

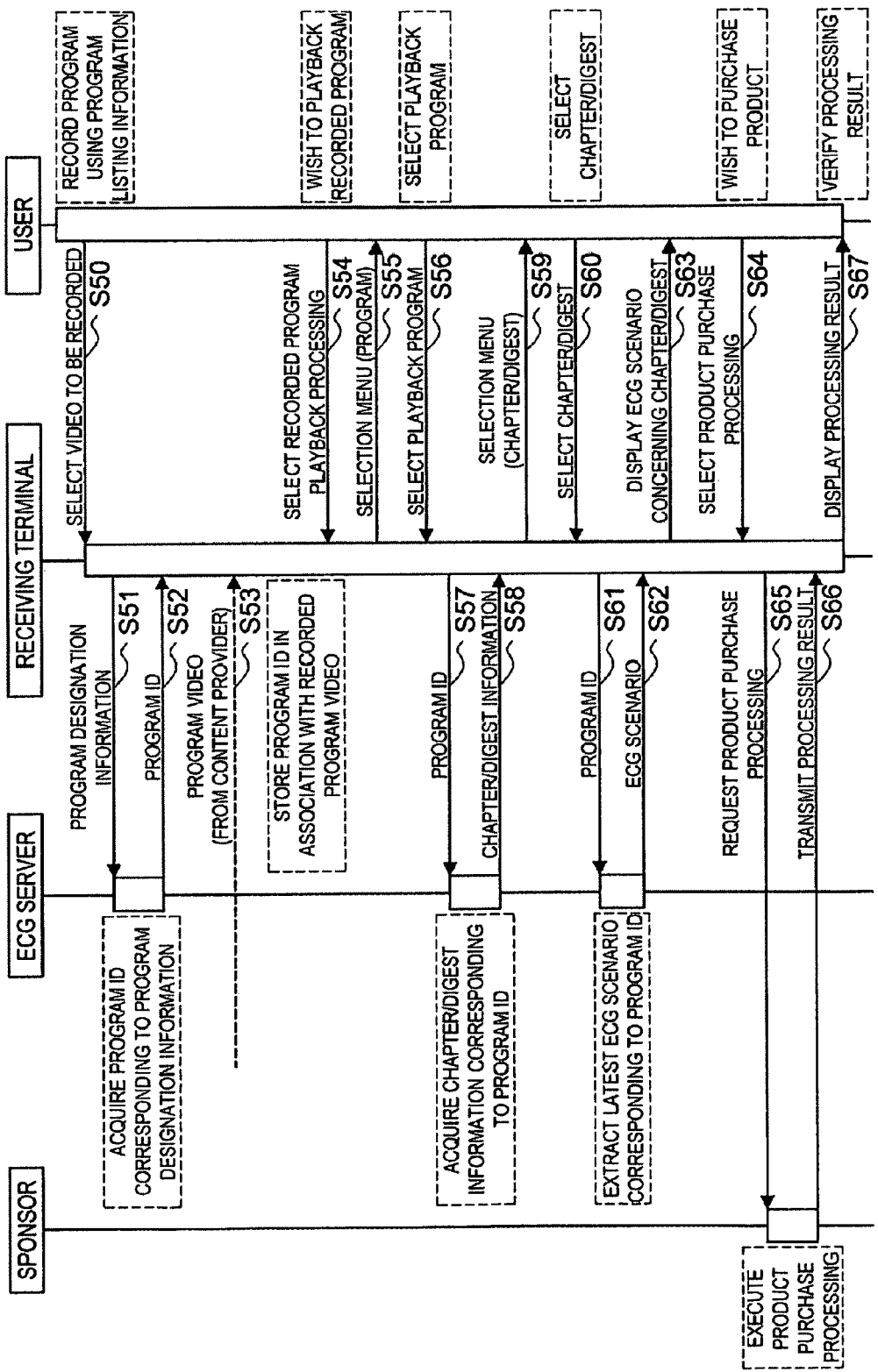

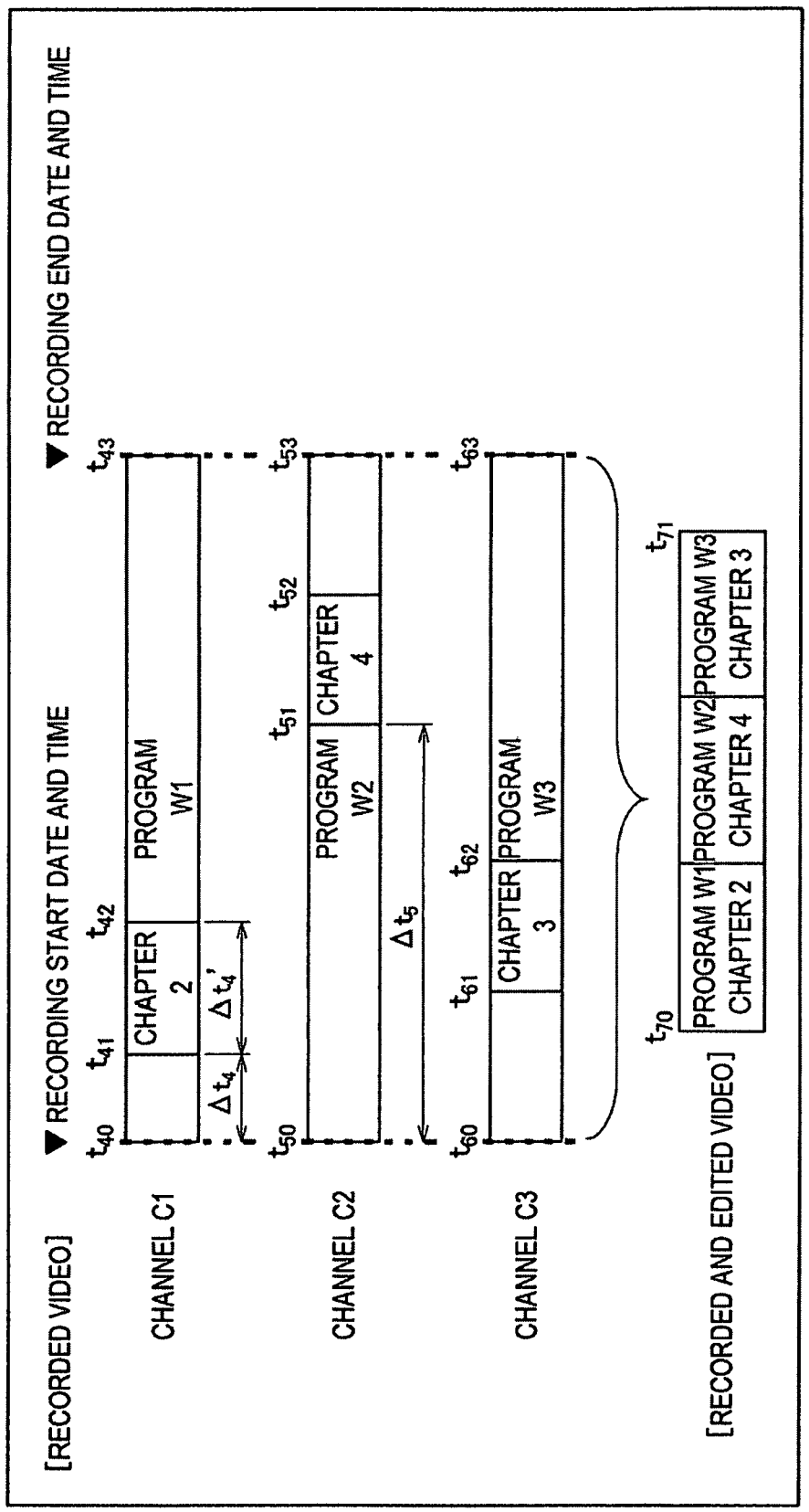

VIDEO PLAYBACK APPARATUS, INFORMATION PROVIDING APPARATUS, INFORMATION PROVIDING SYSTEM, INFORMATION PROVIDING METHOD AND PROGRAM

CROSS REFERENCES TO RELATED APPLICATIONS

The present invention contains subject matter related to Japanese Patent Application JP 2007-207123 filed in the Japan Patent Office on Aug. 8, 2007, the entire contents of which being incorporated herein by reference.

BACKGROUND OF THE INVENTION

1. Field of the Invention

The present invention relates to a video playback apparatus, an information providing apparatus, an information providing system, an information providing method and program.

2. Description of the Related Art

Recently, a system in which content (program) providers transmit video/audio information concerning a program, and a user receives and views the video/audio information using a receiving terminal or records the video/audio information using a recording apparatus and then plays back and views the recorded video/audio information using a playback apparatus has been widespread. In such a system, information related to a program is transmitted together with video information concerning the program, so that a user receives the information related to the program in addition to the video information of the program and browses the related information while viewing the program. Further, there is a system which receives information related to a program at the time of recording reservation or playback of video information of the program and makes it browsable.

For example, Japanese Patent Application Publication No. 2007-104313 discloses an advertisement display processing apparatus which detects a playback title of a recorded broadcast program and/or a distributed content and performs information processing according to specifying information that can specify the detected playback title. In the advertisement display processing apparatus, if a certain playback title is selected, specifying information is transmitted to a server through a communication line, and a client device at the user side acquires the advertising information which is related to or accompanies the specifying information from the server and displays the information.

SUMMARY OF THE INVENTION

In the playback of a recorded program video, there are cases of playing back a specific program video which constitutes a program, such as a chapter video of a program, a digest video of a program and an edited video of a program that is edited by a user, for example. A chapter video is a video which corresponds to each segment when one program is divided into a plurality of segments. A digest video is a video which corresponds to combined segments when a plurality of segments are combined arbitrarily. An edited video is a video which corresponds to edited segments when each of one or more programs is divided into one or more segments and a plurality of segments are edited in arbitrary combination. By playing back a specific program video which constitutes a recorded program, a user can efficiently view a desired program video.

However, although an information providing system of a related art which includes the above-described advertisement display processing apparatus provides information related to a recorded program, it does not provide information related to a specific program video which constitutes a recorded program. Therefore, the information providing system of a related art cannot provide information related to a specific program video to be played back when playing back a chapter video, a digest video or an edited video.

Accordingly, a user cannot browse information related to a specific program video to be played back when playing back a chapter video, a digest video or an edited video of a recorded program. Thus, a user cannot efficiently acquire information related to a specific program video to be played back together with the program video.

On the other hand, a content provider cannot provide information related to a specific program video to be played back when playing back a chapter video, a digest video or an edited video of a recorded program. Thus, a content provider cannot efficiently provide information related to a specific program video to be played back together with the program video to a user. Further, a content provider cannot perform efficient promotion such as providing information related to a specific program video together with the specific program video to be played back after a program is provided (or broadcasted).

In light of the foregoing, it is desirable to provide a video playback apparatus, an information providing apparatus, an information providing system, an information providing method and program which can provide information related to a specific program video which constitutes a recorded program.

According to a first embodiment of the present invention, there is provided a video playback apparatus for playing back a recorded program video, which is connected with an information providing apparatus for providing information related to a program through a communication network. The video playback apparatus includes a designation information transmitting portion to transmit designation information designating a program containing a specific recorded program video to the information providing apparatus, a related information receiving portion to receive the related information associated with the designated program which is selected from related information containing scenario information related to each program video constituting a program and a scheduled time of each program video and stored in association with the program in the information providing apparatus from the information providing apparatus, and a display/playback control portion to control display of the scenario information related to the specific program video in synchronization with playback of the specific program video based on the scheduled time of the program video contained in the related information.

In this configuration, the video playback apparatus transmits designation information designating a program containing a specific recorded program video to the information providing apparatus. The video playback apparatus then receives the related information associated with the designated program which is selected from related information containing scenario information related to each program video constituting a program and a scheduled time of each program video and is stored in association with the program from the information providing apparatus. The video playback apparatus further controls display of the scenario information related to the specific program video in synchronization with playback of the specific program video based on the scheduled time of the program video contained in the related information. Because the display of the scenario information related to the specific program video is thereby controlled in synchronization with playback of the specific program video based on the scheduled time of the program video, a user can browse information related to a specific program video which constitutes a recorded program.

In the above video playback apparatus, one or more program video constituting the program may be edited as a chapter video and/or a digest video of the program, and related information containing scenario information related to each chapter video and/or each digest video and a scheduled time of each program video edited as each chapter video and/or each digest video may be stored in association with the program in the information providing apparatus, and the display/playback control portion may control display of the scenario information related to a specific chapter video and/or a specific digest video in synchronization with playback of each program video edited as the specific chapter video and/or the specific digest video based on the scheduled time of each program video contained in the related information. In this configuration, the related information which contains scenario information related to the chapter video and/or the digest video generated by editing one or more program videos constituting a program and a scheduled time of each program video is stored in association with the program in the information providing apparatus. Then, display of the scenario information related to the specific chapter video and/or the specific digest video is controlled in synchronization with playback of each program video edited as the specific chapter video and/or the specific digest video based on the scheduled time of each program video. A user can thereby browse information related to the chapter video and/or the digest video of a recorded program.

In the above video playback apparatus, selectability of the chapter video and/or the digest video composed of a recorded program video may be determined based on a relationship between the scheduled time of each program video constituting the chapter video and/or the digest video and a recording time of a recorded program video, and the video playback apparatus may further include a playback video selecting portion to select one from the chapter video and/or the digest video determined to be selectable. In this configuration, the chapter video and/or the digest video composed of a recorded program video is selectable based on a relationship between the scheduled time of each program video and a recording time of the recorded program video. A user can thereby select any one of the selectable chapter video and/or the digest video composed of the recorded program video and browse the information related to the selected chapter video and/or digest video.

In the above video playback apparatus, the designation information transmitting portion may transmit recording information regarding a recording channel and a recording time of a recorded program video to the information providing apparatus, and transmit designation information designating a program selected from one or more programs specified as a program containing at least part of a recorded program video by the information providing apparatus based on the recording information to the information providing apparatus. In this configuration, one or more programs are specified based on the recording information, and any one of the specified program is designated as a program which contains a specific program video. Thus, even if a program video is recorded in a program unit or not in a program unit without using program listing information or the like, a user can designate a program which includes the specific program video.

Further, the designation information transmitting portion may transmit recording and editing information regarding a recording channel and a recording time of each recorded and edited program video to the information providing apparatus, and transmit designation information designating a program selected from one or more programs specified as a program containing at least part of a recorded and edited program video by the information providing apparatus based on the recording and editing information to the information providing apparatus. In this configuration, one or more programs are specified based on the recording and editing information, and any one of the specified program is designated as a program which contains a specific program video. Thus, even if program videos of a plurality of programs are recorded and edited, a user can designate a program which includes the specific program video.

In the above video playback apparatus, a plurality of pieces of related information with different generation date and time or update date and time may be stored in association with a program in the information providing apparatus, and the related information receiving portion may receive the related information with latest generation date and time or update date and time concerning a designated program from the information providing apparatus. In this configuration, the related information with the latest generation date and time or update date and time concerning a designated program is received from the information providing apparatus. A user can thereby browse the latest information related to the designated program according to the time point when a recorded program video is played back.

The related information may contain one or more scenario information in a scenario form so as to sequentially display a plurality of pieces of information related to a program video. In this configuration, because the related information contains one or more scenario information in a scenario form so as to sequentially display a plurality of pieces of information related to a program video, a user can efficiently browse information related to a program video.

According to a second embodiment of the present invention, there is provided an information providing apparatus for providing information related to a program, which is connected with a video playback apparatus for playing back a recorded program video through a communication network. The information providing apparatus includes a related information storage portion to store related information containing scenario information related to each program video constituting a program and a scheduled time of each program video in association with the program, a designation information receiving portion to receive designation information designating a program containing a specific recorded program video from the video playback apparatus, a related information extracting portion to extract the related information associated with the designated program from the related information storage portion, and a related information transmitting portion to transmit the extracted related information to the video playback apparatus so that the video playback apparatus controls display of the scenario information related to the specific program video in synchronization with playback of the specific program video based on the scheduled time of the program video contained in the related information.

In this configuration, the information providing apparatus stores related information containing scenario information related to each program video constituting a program and a scheduled time of each program video in association with the program. The information providing apparatus receives designation information designating a program containing a specific recorded program video from the video playback apparatus and extracts the related information related to the designated program. Further, the information providing apparatus transmits the extracted related information to the video playback apparatus so that the video playback apparatus controls display of the scenario information related to the specific program video in synchronization with playback of the specific program video based on the scheduled time of the program video contained in the related information. Because the display of the scenario information related to the specific program video is thereby controlled in synchronization with playback of the specific program video based on the scheduled time of the program video, a content provider can provide information related to the specific program video which constitutes the recorded program to a user.

In the above information providing apparatus, one or more program video constituting a program may be edited as a chapter video and/or a digest video of the program, the related information storage portion may store related information containing scenario information related to each chapter video and/or each digest video and a scheduled time of each program video edited as each chapter video and/or each digest video in association with the program, and the related information transmitting portion may transmit the extracted related information to the video playback apparatus so that the video playback apparatus controls display of the scenario information related to a specific chapter video and/or a specific digest video in synchronization with playback of each program video edited as the specific chapter video and/or the specific digest video based on the scheduled time of each program video contained in the related information. In this configuration, the related information which contains scenario information related to the chapter video and/or the digest video generated by editing one or more program videos constituting a program and a scheduled time of each program video is stored in association with the program. Then, the extracted related information is transmitted to the video playback apparatus so that the video playback apparatus controls display of the scenario information related to the specific chapter video and/or the specific digest video in synchronization with playback of each specific program video based on the scheduled time of each program video contained in the related information. A content provider can thereby provide information related to the chapter video and/or the digest video of the recorded program to a user.

The related information transmitting portion may transmit information for selecting one from the chapter video and/or the digest video contained in the related information related to a designated program to the video playback apparatus. In this configuration, information for selecting the chapter video and/or the digest video contained in the related information related to a designated program is transmitted to the video playback apparatus. A content provider can thereby allow a user to select one from the chapter video and/or the digest video related to the designated program.

In the above information providing apparatus, the related information transmitting portion may transmit the related information related to a designated program selected from programs specified as a program containing at least part of a recorded program video based on recording information regarding a recording channel and a recording time of a recorded program video to the video playback apparatus. In this configuration, one or more programs are specified based on the recording information, and any one of the specified program is designated as a program which contains a specific program video, so that related information of the designated program is transmitted to the video playback apparatus. Thus, even if a program video is recorded in a program unit or not in a program unit without using program listing information or the like, a content provider can provide information regarding a program which includes the specific program video to a user.

Further, the related information transmitting portion may transmit the related information related to a designated program selected from programs specified as a program containing at least part of a recorded and edited program video based on recording and editing information regarding a-recording channel and a recording time of each recorded and edited program video to the video playback apparatus. In this configuration, one or more programs are specified based on the recording and editing information, and any one of the specified program is designated as a program which contains a specific program video, so that related information of the designated program is transmitted to the video playback apparatus. Thus, even if program videos of a plurality of programs are recorded edited, a content provider can provide information regarding a program which includes the specific program video to a user.

In the above information providing apparatus, the related information storage portion may store a plurality of pieces of related information with different generation date and time or update date and time in association with a program, and the related information transmitting portion may transmit the related information with latest generation date and time or update date and time concerning a designated program to the video playback apparatus. In this configuration, the related information with the latest generation date and time or update date and time concerning a designated program is transmitted to the video playback apparatus. A content provider can thereby provide the latest information related to the designated program according to the time point when a recorded program video is played back.

The related information may contain one or more scenario information in a scenario form so as to sequentially display a plurality of pieces of information related to a program video. In this configuration, because the related information contains one or more scenario information in a scenario form so as to sequentially display a plurality of pieces of information related to a program video, a content provider can allow a user to efficiently browse information related to the program video.

According to a third embodiment of the present invention, there is provided an information providing system where a video playback apparatus for playing back a recorded program video and an information providing apparatus for providing information related to a program are connected through a communication network. In the information providing system, the video playback apparatus includes a designation information transmitting portion to transmit designation information designating a program containing a specific recorded program video to the information providing apparatus, a related information receiving portion to receive related information associated with the designated program from the information providing apparatus, and a display/playback control portion to control display of scenario information related to the specific program video in synchronization with playback of the specific program video based on a scheduled time of the program video contained in the related information. The information providing apparatus includes a related information storage, portion to store the related information containing the scenario information related to each program video constituting a program and the scheduled time of each program video in association with the program, a designation information receiving portion to receive the designation information from the video playback apparatus, a related information extracting portion to extract the related information associated with the designated program from the related information storage portion, and a related information transmitting portion to transmit the extracted related information to the video playback apparatus.

In this configuration, the information providing apparatus stores related information containing scenario information related to each program video constituting a program and a scheduled time of each program video in association with the program. The video playback apparatus transmits designation information designating a program containing a specific recorded program video to the information providing apparatus. The information providing apparatus receives the designation information from the video playback apparatus, extracts the related information related to the designated program from the related information storage portion, and transmits the extracted related information to the video playback apparatus. The video playback apparatus then receives the related information related to the designated program from the information providing apparatus and controls display of the scenario information related to the specific program video in synchronization with playback of the specific program video based on the scheduled time of the program video contained in the related information. Because the display of the scenario information related to the specific program video is thereby controlled in synchronization with playback of the specific program video based on the scheduled time of the program video, it is possible to provide information related to the specific program video which constitutes the recorded program.

According to a fourth embodiment of the present invention, there is provided an information providing method which is applied to an information providing system where a video playback apparatus for playing back a recorded program video and an information providing apparatus for providing information related to a program are connected through a communication network. The information providing method includes the steps of storing related information containing scenario information related to each program video constituting a program and a scheduled time of each program video in association with the program in the information providing apparatus, extracting the related information associated with a program designated by the video playback apparatus and containing a specific recorded program video in the information providing apparatus, transmitting the extracted related information to the video playback apparatus, receiving the related information associated with the designated program from the information providing apparatus by the video playback apparatus, and controlling display of the scenario information related to the specific program video in synchronization with playback of the specific program video based on the scheduled time of the program video contained in the related information by the video playback apparatus.

In this method, in the information providing apparatus, related information containing scenario information related to each program video constituting a program and a scheduled time of each program video are stored in association with a program. Then, the related information associated with the program containing a specific recorded program video and designated by the video playback apparatus is extracted, and the extracted related information is transmitted to the video playback apparatus. In the video playback apparatus, the related information related to the designated program is received from the information providing apparatus, and display of the scenario information related to the specific program video is controlled in synchronization with playback of the specific program video based on the scheduled time of the program video contained in the related information. Because the display of the scenario information related to the specific program video is thereby controlled in synchronization with playback of the specific program video based on the scheduled time of the program video, it is possible to provide information related to the specific program video which constitutes the recorded program.

According to a fifth embodiment of the present invention, there is provided a program which causes a computer to function as the video playback apparatus according to the first embodiment of the present invention.

According to a sixth embodiment of the present invention, there is provided a program which causes a computer to function as the information providing apparatus according to the second embodiment of the present invention.

According to the embodiments of the present invention described above, it is possible to provide a video playback apparatus, an information providing apparatus, an information providing system, an information providing method and program which can provide information related to a specific program video which constitutes a recorded program.

BRIEF DESCRIPTION OF THE DRAWINGS

FIG. 3 is an explanatory view conceptually showing an example of the configuration of a receiving terminal which is included in an information providing system.

FIG. 4 is an explanatory view conceptually showing the functional configuration of a receiving terminal.

FIG. 7A is an explanatory view showing an example of metadata (ECG scenario definition information).

FIG. 7B is an explanatory view showing an example of metadata (service provision information).

FIG. 8A is an explanatory view showing an example of metadata (an ECG scenario related to a program).

FIG. 8B is an explanatory view showing an example of metadata (an ECG set related to a program).

FIG. 8C is an explanatory view showing an example of metadata (an ECG set related to a program).

FIG. 9A is an explanatory view showing an example of metadata (an ECG scenario related to a chapter video).

FIG. 9B is an explanatory view showing an example of metadata (an ECG set related to a chapter video).

FIG. 9C is an explanatory view showing an example of metadata (an ECG scenario related to a digest video).

FIG. 9D is an explanatory view showing an example of metadata (an ECG set related to a digest video).

FIG. 13 is an explanatory view showing an example of a selection menu which is displayed during playback of a recorded program.

FIG. 14A is an explanatory view showing an example of the structure of ECG data which is contained in an ECG scenario related to a chapter video of a recorded program.

FIG. 14B is an explanatory view showing an example of the structure of ECG data which is contained in an ECG scenario related to a digest video of a recorded program.

FIG. 15 is an explanatory view showing an example of the structure of an ECG scenario related to a chapter video.

FIG. 16 is an explanatory view showing an example of the structure of an ECG scenario related to a digest video.

FIG. 17 is an explanatory view showing an example of the structure of an ECG scenario related to a recorded and edited video.

FIG. 18 is an explanatory view showing an example of a process flow of an ECG scenario in an entire information providing system (in the case of recording in a program unit).

FIG. 22 is an explanatory view showing a method of synchronizing playback of a program video with display of an ECG scenario (in the case where a recorded program is edited).

DETAILED DESCRIPTION OF THE PREFERRED EMBODIMENTS

Figure 1:
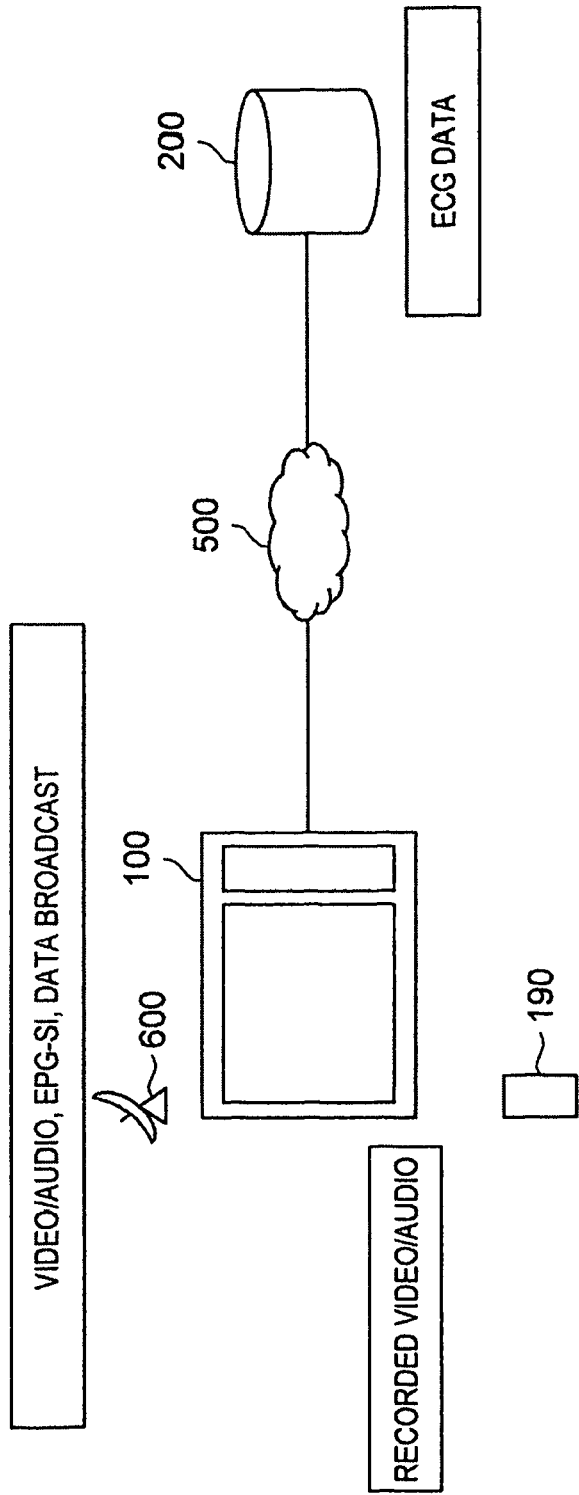
FIG. 1 is an explanatory view conceptually showing the overall configuration of an information providing system according to an embodiment of the present invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

(Overall Configuration of Information Providing System)

FIG. 1 is an explanatory view conceptually showing the overall configuration of an information providing system according to an embodiment of the present invention. Referring to FIG. 1, the information providing system includes a receiving terminal 100 (video playback apparatus) of a user which has a video recording and playback function and an electronic content guide (ECG) server 200 (information providing apparatus) which is operated by an ECG service provider.

The receiving terminal 100 receives video/audio information, data broadcast information and electronic program guide-service information (EPG-SI) which are related to a program through a receiving antenna 600 or the like and provides the information to a user. The receiving terminal 100 plays back and provides video/audio information, data broadcast information and EPG-SI information which are related to a prerecorded program to a user. Further, the receiving terminal 100 according to this embodiment can receive information related to a program from the ECG server 200 which is connected through a communication network 500 and provide the received information to a user. The ECG server 200 registers and manages information related to a program as ECG data and provides the registered and managed ECG data to the receiving terminal 100 through the communication network 500.

A user of the receiving terminal 100 can select information that is viewable or browsable (receivable), such as video/audio information, data broadcast information, EPG-SI information and ECG data which are related to a program, by operating a remote control 190 for the receiving terminal 100, for example. On a display screen of the receiving terminal 100, video information and ECG data which are related to a program are respectively displayed on the left and right sides of the display screen, for example, in the state where the ECG service provision is active.

Figure 2:
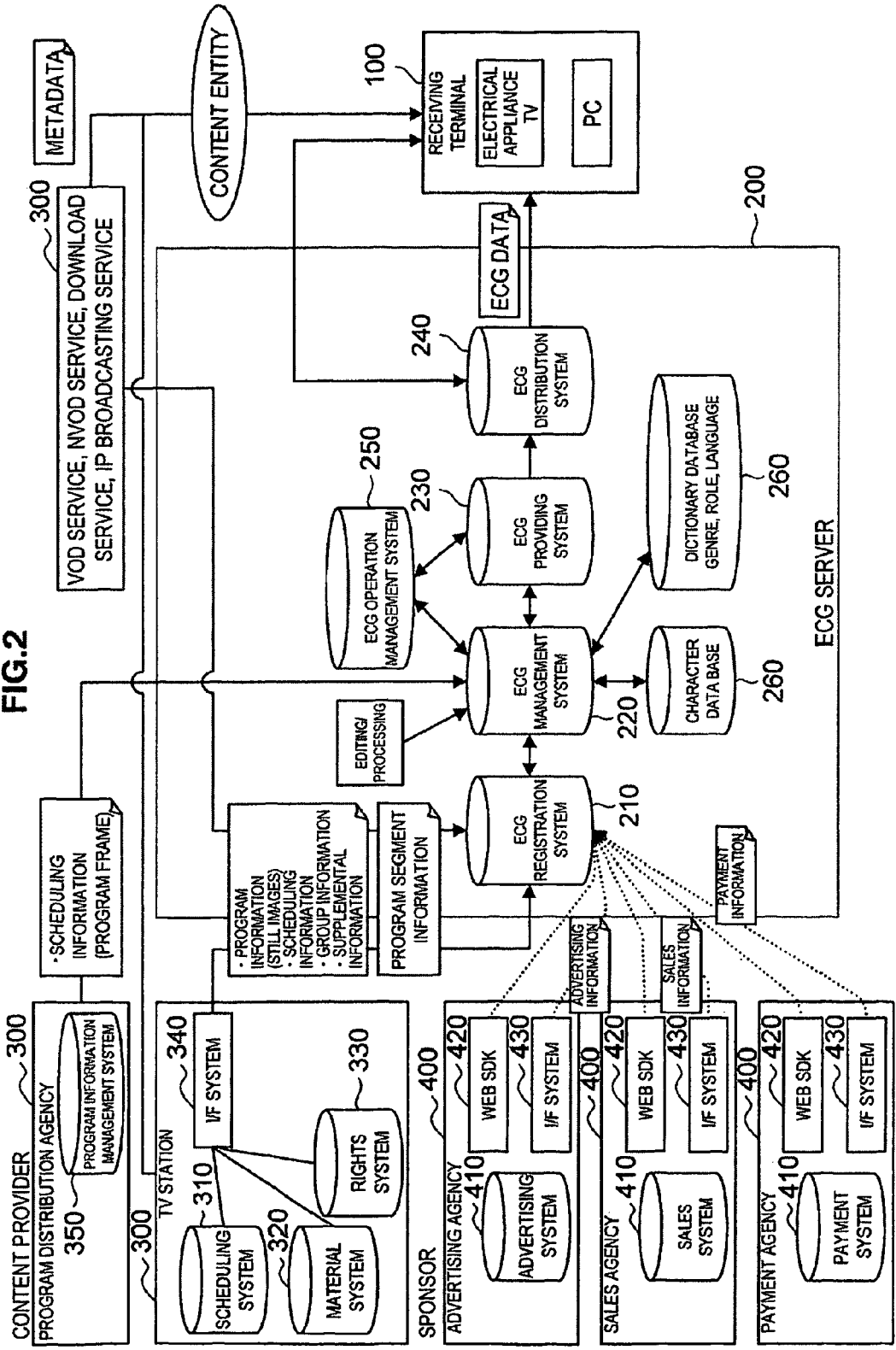
FIG. 2 is an explanatory view showing an example of the overall configuration model of an information providing system.

FIG. 2 is an explanatory view showing an example of the overall configuration model of an information providing system. Referring to FIG. 2, the information providing system includes the receiving terminal 100, the ECG server 200, a content provider (content providers) 300 and a sponsor (sponsors) 400.

The content provider 300 may include a TV station, a data broadcast station, a program distribution agency and so on, for example. The content provider 300 provides video/audio information, data broadcast information and EPG-SI information related to a program to the receiving terminal 100, and provides program information related to a program, detail information which is described later, chapter information and/or digest information to the ECG server 200. The information related to a program includes program information (including still image information), scheduling information, group information, supplemental information, program segment information and so on (which are collectively referred to hereinafter as program information).

The TV station operates a scheduling system 310, a material system 320, a right system 330 and so on which manage program information related to a program. The data broadcast station operates a program information management system which manages program information related to a provided program that is provided by video-on-demand (VOD), near video-on-demand (NVOD), download, IP broadcasting services or the like. The program distribution agency operates a program information management system 350 which manages program information (scheduling information) related to a distributed program.

The sponsor 400 may include an advertising agency, a sales agency, a payment agency and so on which respectively provide advertising, sales and payment services, for example. In some cases, it may also include a content provider which provides video/audio information that is related to a program. The sponsor 400 provides service provision information related to a program which includes advertising information, sales information, payment information, program information and so on to the receiving terminal 100 through the ECG server 200.

The sponsor 400 operates different kinds of information processing system 410 according to business type such as advertising, sales or payment system, a Web software development kit (SDK) 420, an I/F system 430 and so on. The sponsor 400 provides advertising information and sales information which introduce products or services that are sold or provided by an advertiser of the sponsor 400 or the sponsor 400 itself, for example. If the sponsor 400 is a payment agency, it provides payment information in the processing of product purchase based on sales information. If the sponsor 400 is a content provider, it provides program information which introduces a program that is provided or distributed by the sponsor 400.

(Overall Configuration of Information Providing Apparatus)

The ECG server 200 (information providing apparatus) is operated by an information service provider or the like which produces, manages and provides information related to a program as ECG data. The ECG server 200 includes an ECG registration system 210, an ECG management system 220, an ECG providing system 230, an ECG distribution system 240, an ECG operation management system 250, a database 260 and so on.

The ECG registration system 210 registers information related to a program (program information, service provision information etc.) which is provided from the content provider 300 and the sponsor 400. The database 260 include a character database and a dictionary database, for example, and store detail information concerning program information such as program scheduling, cast, genre, music and event related to a program.

The ECG management system 220 manages the program information and the service provision information which are registered in the ECG registration system 210 and the detail information which is stored in the database 260. The ECG management system 220 performs various editing and processing on the program information, the service provision information and the detail information. Particularly, the ECG management system 220 produces information related to a program as ECG data and establishes associations or set priorities among the ECG data, thereby editing a plurality of pieces of ECG data into an ECG scenario, as described in detail later.

Further, the ECG management system 220 produces program listing information which contains scheduling information of a plurality of programs as ECG data by performing editing and processing on program information. The information provided as the program listing information which is produced as ECG data is not limited as electronic program guide (EPG) information of a related art, and the program listing information may contain information such as still images contained in program information, for example, in addition to information concerning a provision time and an overview of a program. The program listing information is in conjunction with scheduling information, and it is updated in real time according to a change in program scheduling or the like.

The ECG providing system 230 provides the ECG data such as an ECG scenario and program listing information which are managed by the ECG management system 220 to the receiving terminal 100 through the ECG distribution system 240. In response to a request from the receiving terminal 100, the ECG distribution system 240 distributes the ECG data which is provided from the ECG providing system 230 to the receiving terminal 100. The ECG operation management system 250 controls the ECG management system 220 and the ECG providing system 230, thereby managing the entire system operation of the ECG server 200.

In the ECG server 200, the ECG registration system 210, the ECG management system 220 and the database 260, for example, serve as a related information storage portion 270 or the like, which is described later. The ECG providing system 230 serves as a related information extracting portion 274 or the like, which is also described later. The ECG distribution system 240 serves as a designation information receiving portion 272, a related information transmitting portion 276, a control portion 278 and so on, which are also described later. Such a configuration is illustrated by an example only, and the configuration of the ECG server 200 is not limited to the above-described configuration.

(Configuration of Receiving Terminal)

FIG. 3 is an explanatory view conceptually showing the exemplary configuration of a receiving terminal 100 which is included in an information providing system and serves also as a video playback apparatus that has a program video playback function. Referring to FIG. 3, the receiving terminal 100 may be a broadcast receiving terminal such as a TV terminal, a portable terminal or a mobile terminal, a set top box (STB), a CATV terminal, an internet protocol television (IPTV) terminal, a personal video recorder (PVR), a personal computer (PC), a cellular phone or a personal digital assistant (PDA), for example.

The receiving terminal 100 receives programs which are provided through various transmission lines, such as analog terrestrial broadcasting, digital terrestrial broadcasting, broadcast satellite (BS) analog broadcasting, BS digital broadcasting, communication satellite (CS) 124/128-degree broadcasting, CS 110-degree broadcasting, digital common antenna television (CATV) broadcasting, analog CATV broadcasting and optical fiber broadcasting, for example, through the receiving antenna 600 or the like. Further, the receiving terminal 100 communicates with an external system and an external device through the communication network 500 which includes an optical fiber, asymmetric digital subscriber line (ADSL), a telephone modem or the like, for example.

The receiving terminal 100 may be operated using a remote control, a keyboard, a mouse and so on. A remote control 190 for the receiving terminal 100 may include a channel selection button for selecting the channel of a program to be received, a recording/playback button, an up/down/left/right button, an enter button, a return button and so on, for example. A user of the receiving terminal 100 can directly select the channel of a currently viewable program or directly record a currently viewable program by operating the channel selection button or the recording button. Alternatively, a user can select the channel of a program or record/reserve recording of a program by selecting a desired program by operating the up/down/left/right button or the like based on program listing information (channel selection menu). The up/down/left/right button, the enter button and the return button may be operated in the same manner for the selection and determination of various information, besides the program channel selection, recording and playback.

The remote control 190 may further include an EPG-SI information button, a data broadcast information button, an ECG service button and so on, for example. A user can obtain the provision of EPG-SI information and data broadcast information from the content provider 300 by operating the EPG-SI information button and the data broadcast information button, respectively. A user can also obtain the provision of an ECG service to the ECG server 200 by operating the ECG service button.

Although the operation method using the remote control 190 is described above, the operation method using a keyboard, a mouse or an operating portion in the main body of the receiving terminal 100 is substantially the same as the operation method using the remote control 190, and a detailed description is omitted.

FIG. 4 is an explanatory view conceptually showing the functional configuration of a receiving terminal. Each functional block of the receiving terminal 100 is controlled by a computer system which includes CPU or the like. A storage portion which is included in the receiving terminal 100 and/or a recording medium which is removable from the receiving terminal 100 stores a program for causing each functional block to be functioning.

Referring to FIG. 4, the receiving terminal 100 includes a broadcast processing portion 110, an ECG software processing portion 120, a display/playback portion 150 and a device control portion 160. The broadcast processing portion 110 includes a video/audio information receipt, recording and playback function 112, a data broadcast receipt, recording and playback function 114 and an EPG receipt and control function 116. The ECG software processing portion 120 includes an ECG data acquisition function 122, an ECG data browsing function 124 and an ECG data processing function 126.

In the receiving terminal 100, with the function of the video/audio information receipt, recording and playback function 112 and the data broadcast receipt, recording and playback function 114, the broadcast processing portion 110 serves, in conjunction with a broadcast receiving portion 170, as a video recording/playback portion 134 or the like, which is described later. With the functions of the ECG data acquisition function 122, the ECG software processing portion 120 serves, in conjunction with a communication control portion 180, as a designation information transmitting portion 130, a related information receiving portion 132 or the like, which are also described later. Further, with the functions of the ECG data browsing function 124 and the ECG data processing function 126, the ECG software processing portion 120 serves as a control portion 140 that includes a display/playback control portion 142 and a playback video selecting portion 144 or the like, which are described later, by processing ECG data that is acquired from the ECG server 200. The display/playback portion 150 serves, in conjunction with the broadcast processing portion 110, the ECG software processing portion 120, the device control portion 160 and so on, as a display/playback portion 136 or the like, which is described later. Further, the remote control 190 serves as an operation input portion 138 or the like, which is described later. Such a configuration is illustrated by an example only, and the configuration of the receiving terminal 100 is not limited to the above-described configuration.

(Element of Receiving Terminal and ECG Server)

Figure 5A:
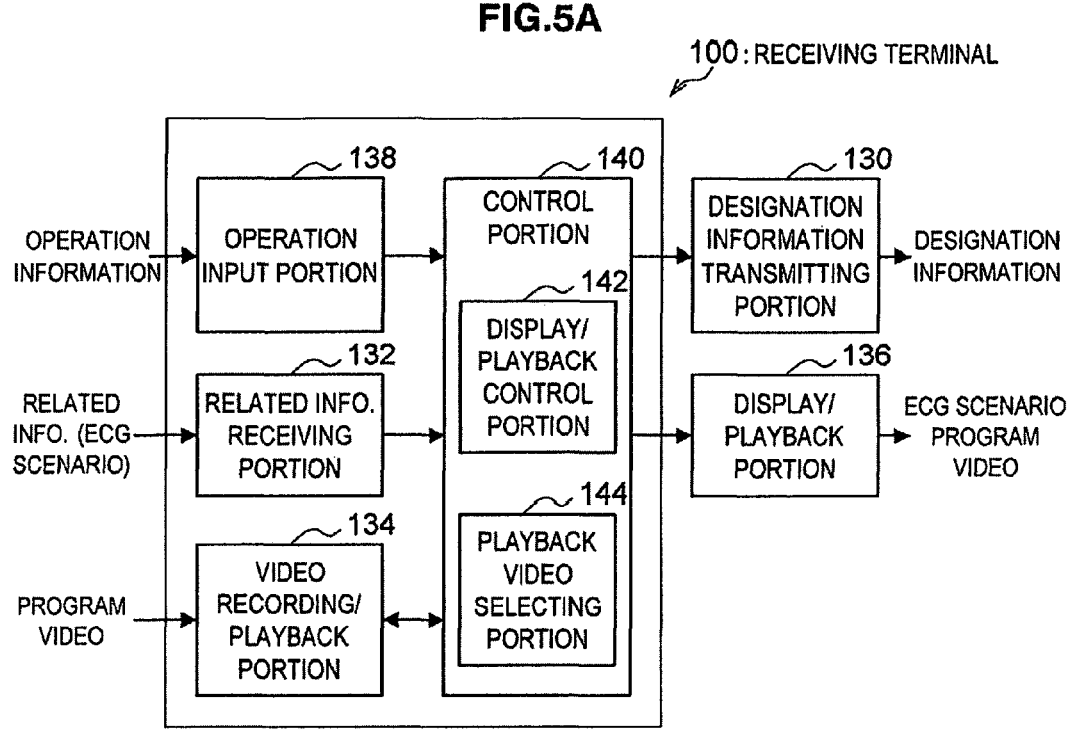
FIG. 5A is a block diagram showing main elements of a receiving terminal.
Figure 5B:
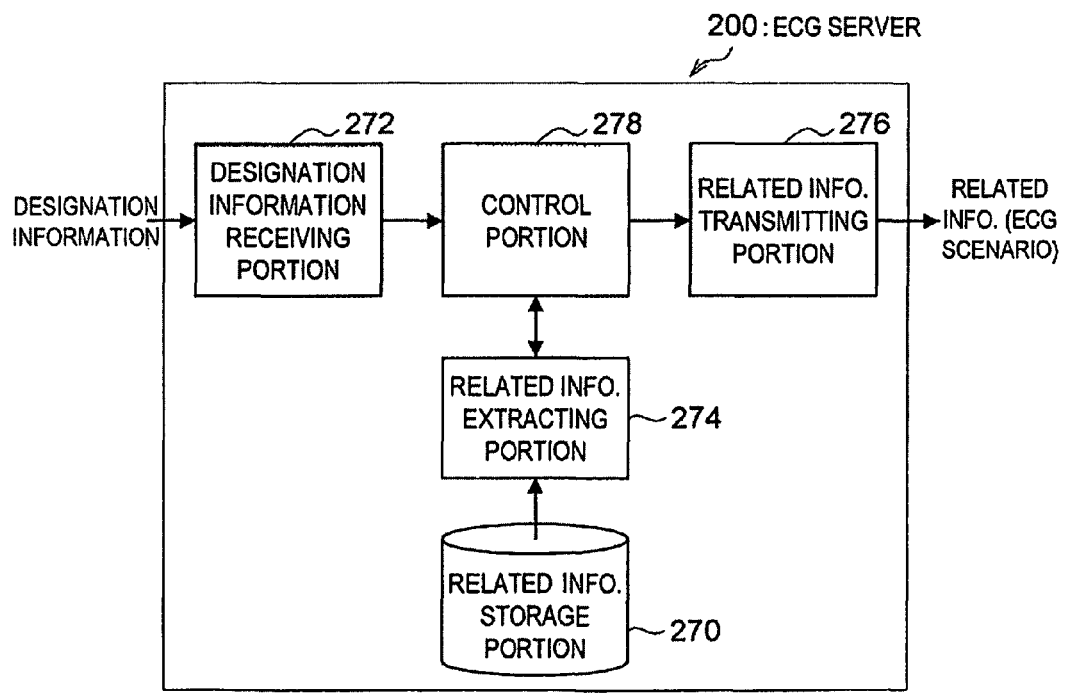
FIG. 5B is a block diagram showing main elements of an ECG server.

FIGS. 5A and 5B are block diagrams showing the main elements of the information providing system according to this embodiment.

The receiving terminal 100 shown in FIG. 5A includes a designation information transmitting portion 130, a related information receiving portion 132, a video recording/playback portion 134, a display/playback portion 136, an operation input portion 138 and a control portion 140. The control portion 140 includes a display/playback control portion 142 and a playback video selecting portion 144.

The designation information transmitting portion 130 transmits designation information which designates a program that contains a specific recorded program video to the ECG server 200. The related information receiving portion 132 receives the related information related to a designated program, which is selected from related information that includes an ECG scenario related to each program video constituting a program and a scheduled time of each program video and that is stored in association with the program, from the ECG server 200. The video recording/playback portion 134 is a functional component that records a program video and plays back a recorded program video.

The display/playback portion 136 is a functional component that plays back a program video and displays an ECG scenario. The operation input portion 138 is a functional component that receives an operation input by a user such as designation of a specific program video to be played back and operation regarding an ECG scenario. The control portion 140 is a functional component that controls the function of the entire elements of the receiving terminal 100, and it includes the display/playback control portion 142 and the playback video selecting portion 144. The display/playback control portion 142 controls the display of an ECG scenario related to a specific program video in synchronization with the playback of the specific program video based on a scheduled time of the program video which is contained in the related information. The playback video selecting portion 144 is a functional component that selects a selectable chapter video and/or a digest video or a recorded and edited video.

The ECG server 200 shown in FIG. 5B includes a related information storage portion 270, a designation information receiving portion 272, a related information extracting portion 274, a related information transmitting portion 276 and a control portion 278.

The related information storage portion 270 stores related information which includes an ECG scenario related to each program video constituting a program and a scheduled time of each program video in association with a program. The designation information receiving portion 272 receives designation information which designates a program that contains a specific recorded program video from the receiving terminal 100. The related information extracting portion 274 extracts the related information which is associated with a designated program from the related information storage portion 270. The related information transmitting portion 276 transmits the extracted related information to the receiving terminal 100 in order for the receiving terminal 100 to control the display of the ECG scenario related to a specific program video in synchronization with the playback of the specific program video based on a scheduled time of the program video which is contained in the related information.

(Structure of ECG Scenario)

Figure 6:
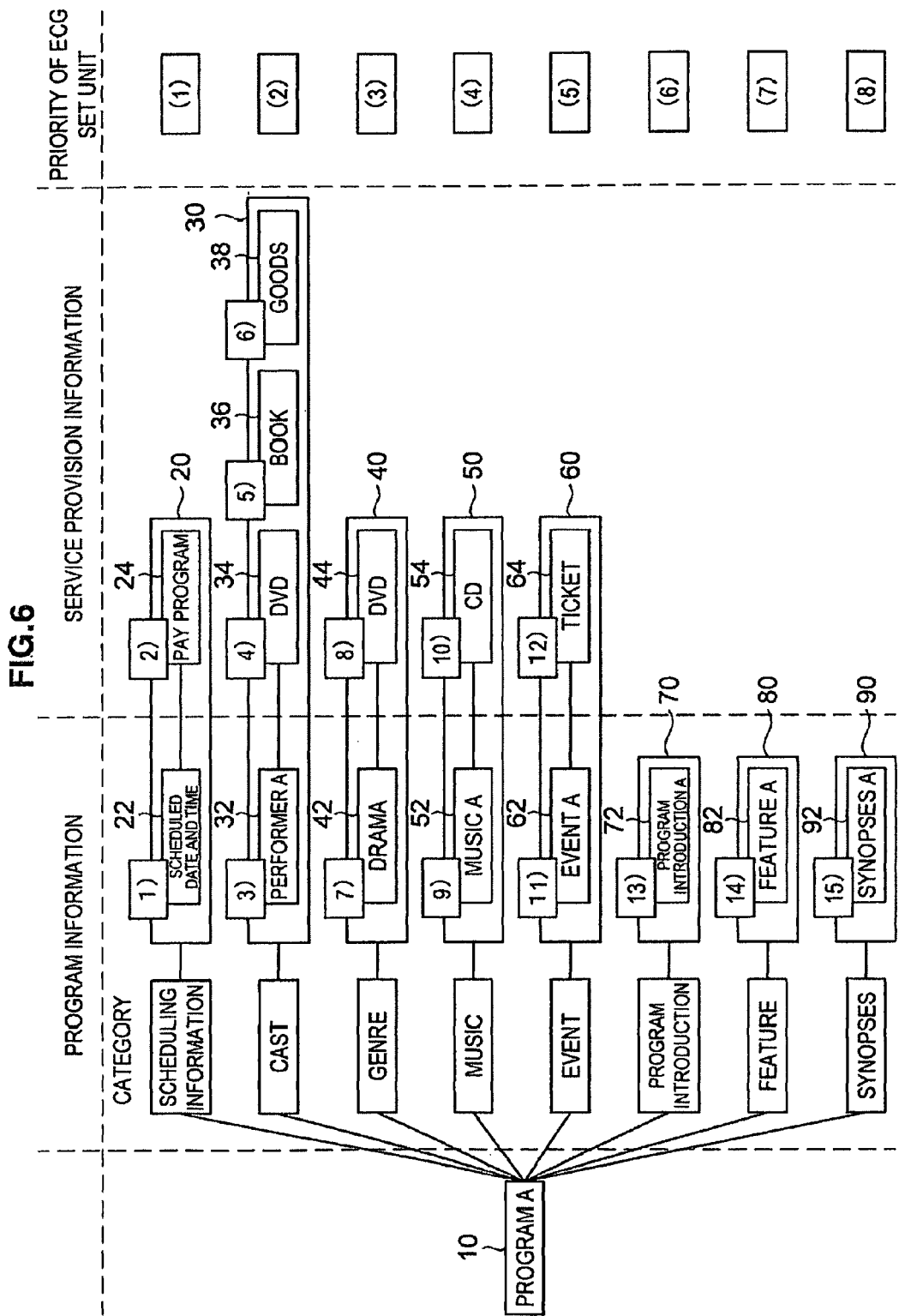
FIG. 6 is an explanatory view showing an example of the structure of ECG data which is contained in an ECG scenario.

FIG. 6 is an explanatory view showing the exemplary structure of ECG data which are contained in an ECG scenario. Referring to FIG. 6, an ECG scenario contains program information related to a program, service provision information related to a program, and association information which establishes association among a program, program information and service provision information. An ECG scenario is a collection of ECG sets, each set composed of at least one of program information and service provision information. Further, priorities may be set to ECG sets which constitute an ECG scenario and to program information and/or service provision information which constitute each ECG set as described below.

In the ECG scenario which is illustrated in FIG. 6, the program information which are associated with the program A10 include "scheduled date and time" 22, "performer A" 32, "drama" 42, "music A" 52, "event A" 62, "program introduction A" 72, "feature A" 82 and "synopses A" 92. The program information are classified into categories of scheduling information, cast, genre, music, event, program introduction, feature and synopses, respectively.

Further, the service provision information is associated with each program information. For example, the service provision information "DVD" 34, "book" 36 and "goods" 38 are associated with the program information "performer A" 32. Thus, one ECG set 30 which includes the program information "performer A" 32 and the service provision information "DVD" 34, "book" 36 and "goods" 38 is formed. Further, an ECG scenario which is a collection of all or part of the ECG sets 20 to 90 that respectively correspond to the program information is formed.

Priorities "(1)" to "(8)" are respectively set to the ECG sets 20 to 90 which respectively correspond to the program information "scheduled date and time" 22, "performer A" 32, "drama" 42, "music A" 52, "event A" 62, "program introduction A" 72, "feature A" 82 and "synopses A" 92. Further, priorities are also set to the program information and the service provision information according to the priorities of the ECG sets. For example, priorities "3)", "4)", "5)" and "6)" are respectively set to the program information "performer A" 32 and the service provision information "DVD" 34, "book" 36 and "goods" 38 which are associated with the program information "performer A" 32.

Accordingly, in the execution of the ECG scenario, after the program information "performer A" 32 is displayed, the service provision information "DVD" 34, "book" 36 and "goods" 38 which are associated with the program information "performer A" 32 are sequentially displayed, and then the program information "drama" 42 with the priority "7)" is displayed after that.

The ECG scenario contains program information and service provision information and is associated with detail information concerning the program information and detail information concerning the service provision information.

The detail information concerning program information includes detail information about program scheduling and cast, detail information about music and event related to a program and so on, for example. The detail information concerning service provision information includes, if it is the service provision information about sales, information about purchase and payment procedure, for example. If it is the service provision information about advertising information, the detail information concerning the service provision information includes detail information of advertisement, for example. If it is the service provision information about program information, the detail information concerning the service provision information includes information about recording/viewing reservation of a program, for example.

The detail information concerning program information is provided from the ECG server 200 to the receiving terminal 100 in response to a request of a user which is made while the relevant program information is displayed. The detail information concerning service provision information is provided from the sponsor 400 to the receiving terminal 100 through the ECG server 200 in response to a request of a user which is made while the relevant service provision information is displayed. The detail information concerning service provision information may include information about processing such as purchase and payment procedure, questionnaire and recording/viewing reservation, for example, and prescribed processing is performed between a user and the sponsor 400 through the receiving terminal 100 based on the information.
(Metadata of ECG Scenario)

FIGS. 7 to 9 are explanatory views showing examples of metadata which constitute an ECG scenario (related information). FIG. 7A illustrates ECG scenario definition information, and FIG. 7B illustrates service provision information. FIG. 8A illustrates metadata of an ECG scenario related to a program, and FIGS. 8B and 8C illustrate metadata of ECG sets related to a program. FIGS. 9A and 9B illustrate metadata of an ECG scenario and an ECG set related to a chapter video, and FIGS. 9C and 9D illustrate metadata of an ECG scenario and an ECG set related to a digest video, respectively.

The metadata of ECG scenario definition information shown in FIG. 7A contains description of information for associating a program with an ECG scenario related to a program, a chapter video and/or a digest video. The metadata contains description of information such as a program genre, a keyword, a cast, a chapter video and a digest video. In the metadata, "P00001", "professional style", "documentary", "AAA BBB know-how impression" and "sc00001" are described as a program ID, a program name, a genre, keywords, and a reference ID (relation_ref) of an ECG scenario related to a program, respectively. Further, "2007/7/10 22:00:00" and "2007/7/10 23:00:00" are described as the provision start date and time and the provision end date and time of the program, respectively. Furthermore, the casts who appear on the program are described, and it is described for the cast with the person ID "1_1" that a name is "AAA" and a birthplace is "Japan", for example.

Further, the metadata contains chapter information which defines an association between a chapter video of a program and an ECG scenario related to the chapter video. In the meta data, "ch_1_001" and "1.0" are described as a chapter video list ID and a version, respectively, and three chapter videos which constitute a chapter video list are described. The chapter video with the ID "1" and the name "chapter 1" is composed of a program video which has a duration of 15 minutes (00:15:00) from a program provision start time "00:00:00", and "AAA DDD" and "ch001" are described as keywords and a reference ID (relation_ref) of an ECG scenario related to the chapter video, respectively.

The metadata also contains digest information which defines an association between a digest video of a program and an ECG scenario related to the digest video. In the meta data, "d_1_001" and "1.0" are described as a, digest video list ID and a version, respectively, and a digest video which constitutes a digest video list is described. The digest video with the ID "1" and the name "digest 1" corresponds to a program video which has a duration of 15 minutes (00:15:00) in total, and "AAA DDD" and "d001" are described as keywords and a reference ID (relation_ref) of an ECG scenario related to the digest video, respectively. It is also described that the digest video is composed of a program video with a duration of 10 minutes (00:10:00) from the time point that is 10 minutes (00:10:00) after the start of program provision and a program video with a duration of 5 minutes (00:05:00) from the time point that is 30 minutes (00:30:00) after the start of program provision.

The metadata of service provision information shown in FIG. 7B contains descriptions of information such as a service provision information genre, keywords, a place to obtain detail information and so on. In the metadata, "C00001", "product 1", "publication", "XXX YYY ZZZ", "zony", "100 yen" and "www.zony.co.jp" are described as a service provision information ID (content id), a service provision information name, a genre, keywords, a maker, a price, and a place to obtain detail information, respectively.

The metadata of an ECG scenario shown in FIG. 8A contains descriptions of information of ECG sets which constitute an ECG scenario related to a program. In the metadata, "sc00011", "ECG scenario (program)", "2007/7/1 00:00:00" and "2007/7/20 00:00:00" are described as an ECG scenario ID, an ECG scenario name, and the provision start date and time and the provision end date and time (or valid period) of the ECG scenario, respectively. In addition, it is described that the provision date and time of a program to which the ECG scenario is associated is from 22:00 to 23:00 on 2007/7/10. Further, an ECG set 1 and an ECG set 2 which constitute the ECG scenario are designated, and it is described that an item ID (ecg_set_content id) and an ECG set ID of the ECG data which constitute each ECG set are "ecg_set_c1" and "es00001" and "ecg_set_c2" and "es00002", respectively. The ECG data which constitute the ECG set is also provided as a part of the ECG scenario.

The metadata of an ECG set shown in FIG. 8B contains descriptions of information such as program information and service provision information which constitute the ECG set 1 described above. In the metadata, "es00001", "ECG set 1", "2007/7/1 00:00:00" and "2007/7/20 00:00:00" are described as an ECG set ID, an ECG set name, and the provision start date and time and the provision end date and time (or valid period) of the ECG set, respectively. Further, four pieces of ECG data with the item ID (content id) "c11", "c12", "c13" and "c14" which constitute the ECG set 1 are described. For example, it is described for the ECG data with the item ID "c11" that a data type, a program information ID, provision start date and time and provision end date and time are "program (program information)", "P011", "2007/7/1 00:00:00" and "2007/7/10 22:00:00", respectively. On the other hand, it is described for the ECG data with the item ID "c14" (content id) that a data type, a service provision information ID, provision start date and time and provision end date and time are "product (product information)", "C011", "2007/7/1 00:00:00" and "2007/7/20 00:00:00", respectively.

The provision start date and time and the provision end date and time of the ECG data with the item ID "cell", "c12" and "c13", which correspond to program information, are set to the period before the program provision date and time (22:00 to 23:00 on 2007/7/10), the period of the program provision date and time, and the period after the program provision date and time, respectively. On the other hand, the provision start date and time and the provision end date and time of the ECG data with the item ID "c14", which corresponds to service provision information, is set to the period before and after the program provision date and time including the program provision date and time. Thus, when the ECG scenario related to a program which contains the ECG set 1 is executed, the ECG data with the item ID "c11", "c12" and "c13" are displayed as program information sequentially in the period before the program provision date and time, the period of the program provision date and time, and the period after the program provision date and time. On the other hand, the ECG data with the item ID "c14" is displayed as service provision information in the period before and after the program provision date and time including the program provision date and time.

The metadata of an ECG set shown in FIG. 8C contains descriptions of information such as program information and service provision information which constitute the ECG set 2 described above. In the metadata, three pieces of ECG data with the item ID (content id) "c21", "c22" and "c23", which constitute the ECG set 2, are described. Detailed description of the ECG data is omitted because it is the same as the metadata of the ECG set 1 shown in FIG. 8B.

The metadata of the ECG scenario related to a chapter video shown in FIG. 9A contains descriptions of information of an ECG set which constitutes an ECG scenario related to a chapter video of a program. In the metadata, "ch001" and "ECG scenario (chapter 1)" are described as an ECG scenario ID and name, respectively. Further, an ECG set with an ECG set ID "es0000dc1" shown in FIG. 9B is designated as an ECG set which constitutes the ECG scenario. The ECG scenario is executed when playback of a chapter video "chapter 1" (cf. FIG. 7A) which refers to the ECG scenario ID "ch001" is selected, and displays the ECG set in reference.

The metadata of the ECG scenario related to a digest video shown in FIG. 9C contains descriptions of information of an ECG set which constitutes an ECG scenario related to a digest video of a program. In the metadata, "d001" and "ECG scenario (digest 1)" are described as an ECG scenario ID and name, respectively. Further, an ECG set with an ECG set ID "es0000d1" shown in FIG. 9D is designated as an ECG set which constitutes the ECG scenario. The ECG scenario is executed when playback of a digest video "digest 1" (cf. FIG. 7A) which refers to the ECG scenario ID "d001" is selected, and displays the ECG set in reference.

(Establishment of Association Between Program and ECG Scenario)

Figure 10:
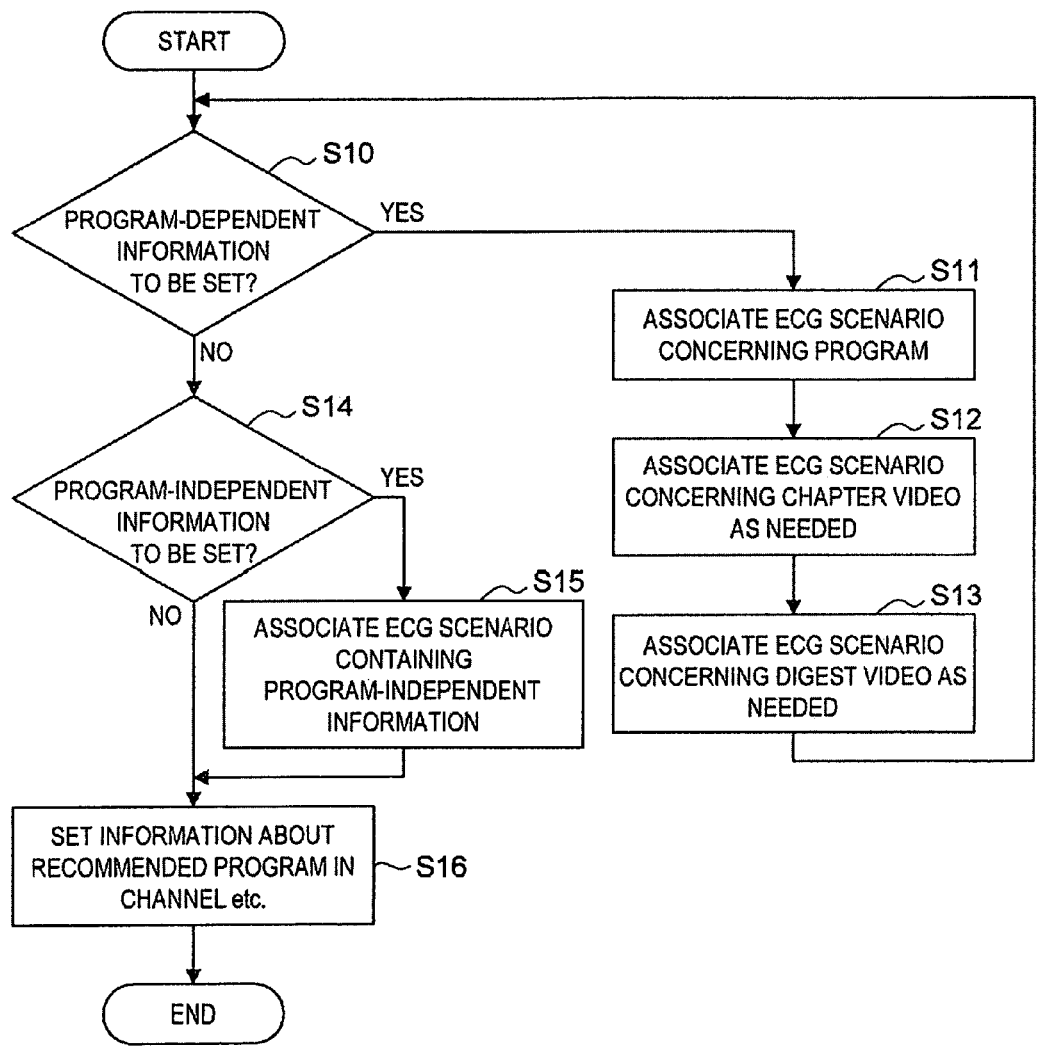
FIG. 10 is a flowchart showing an example of a procedure to associate an ECG scenario with a program.

FIG. 10 is a flowchart showing an example of the procedure to associate an ECG scenario with a program.

Referring to FIG. 10, when associating an ECG scenario (related information) with a program, it is determined whether to set an ECG scenario which contains program-dependent information (S10). If it is determined to set such an ECG scenario, the ECG scenario related to a program is associated with the program (511). Further, when associating the ECG scenario related to a program, an ECG scenario related to a chapter video and/or a digest video may be associated according to need (S12, S13). If, on the other hand, it is determined not to set the ECG scenario which contains program-dependent information, it is further determined whether to set an ECG scenario which contains program-independent information (S14). If it is determined to set such an ECG scenario, the ECG scenario which contains program-independent information is associated with the program (S15). If it is determined not to set such an ECG scenario, ECG data which includes information related to a recommended program in a channel, a name and a logotype of the content provider 300 and so on is set (S16). Alternatively, only an ECG scenario, related to a chapter video and/or a digest video may be associated with a program.

The program-dependent information is information which is directly related to a program, which is ECG data as shown in FIG. 6, for example. On the other hand, the program-independent information is information which is not directly related to a program, which is ECG data such as a program that is scheduled to be provided, a VOD content that is not dependent on program scheduling, information related to a program that is recommended by the content provider 300 or information different from a program that is provided from the content provider 300, for example.

Figure 11:
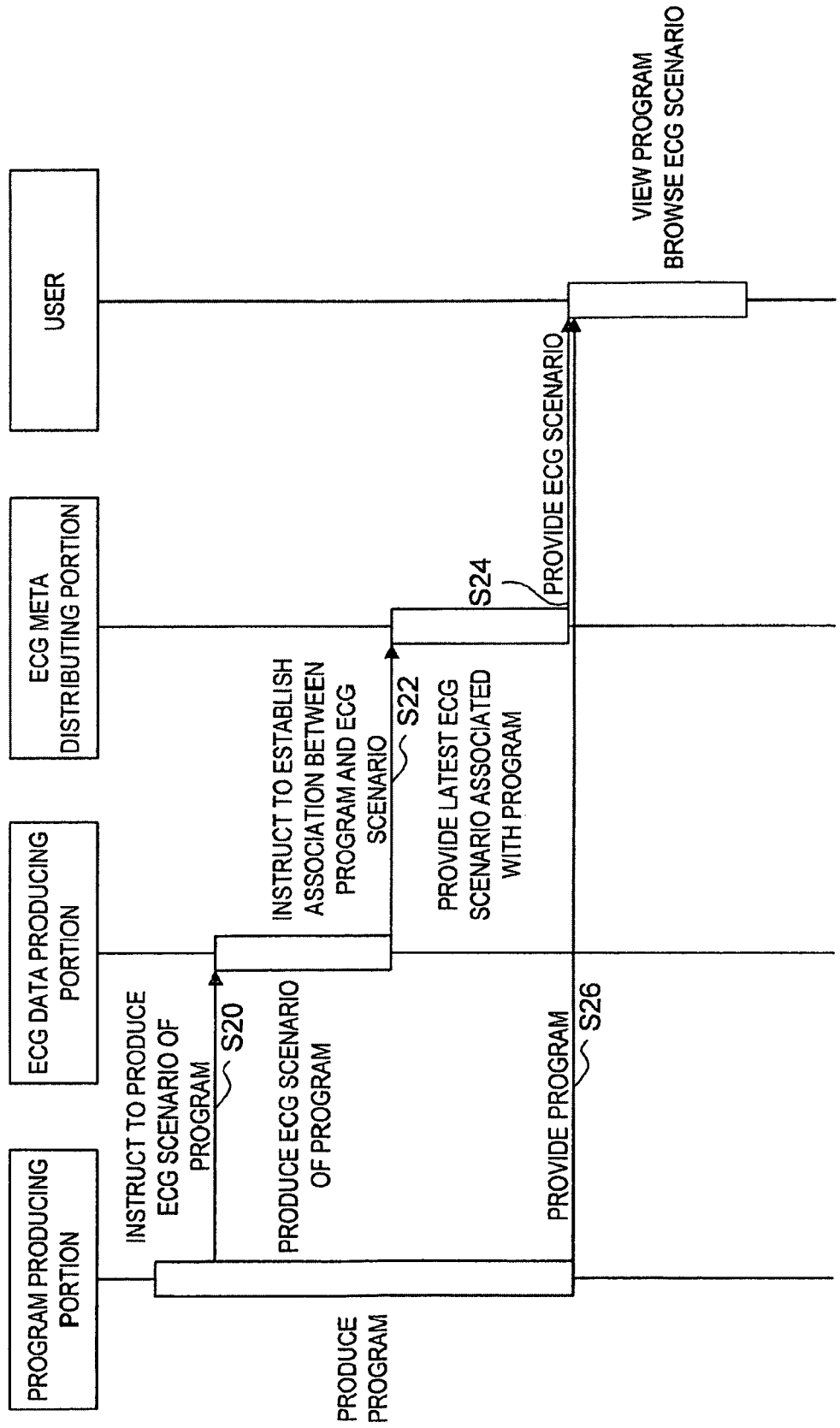
FIG. 11 is a sequence chart showing a flow from production to provision of a program and an ECG scenario.

FIG. 11 is a sequence chart showing the flow from the production to the provision of a program and an ECG scenario.

Referring to FIG. 11, a program producing portion such as the content provider 300 produces a program and instructs an ECG data producing portion to produce ECG scenario (related information) (S20). The ECG data producing portion, which is a part of the ECG server 200, produces an ECG scenario based on the instruction from the program producing portion and then instructs an ECG meta distributing portion to associate the ECG scenario with the program (S22). The ECG meta distributing portion, which is also a part of the ECG server 200 provides the latest ECG scenario in association with the program. Then, the ECG meta distributing portion provides the ECG scenario which is associated with the program as shown in FIGS. 7 to 9, for example (S24), in addition to providing the program from the program producing portion (content provider 300) (S26) to a user. ECG scenarios related to a chapter video and a digest video are also produced and associated with the program in the same manner as an ECG scenario related to a program. However, ECG scenarios related to a chapter video and a digest video are provided after a program is provided (after broadcast) without provision of the program, unlike an ECG scenario related to a program.

(Process Flow of ECG Scenario)

Figure 12:
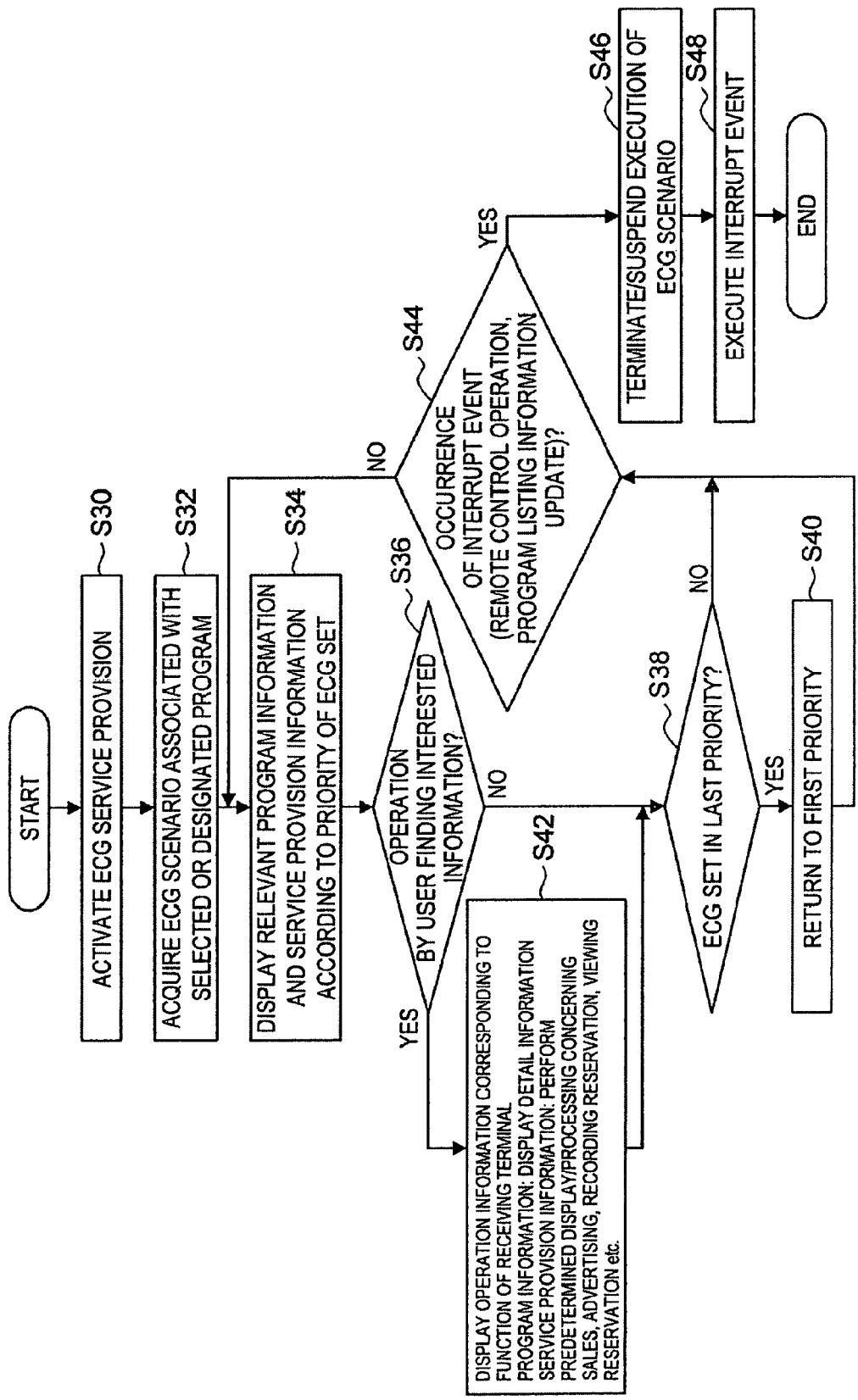
FIG. 12 is a flowchart showing a process flow in the execution of an ECG scenario.

FIG. 12 is a flowchart showing a process flow in the execution of an ECG scenario.

Prior to the execution of an ECG scenario (related information), the provision of an ECG service is activated through the operation of the receiving terminal 100 by a user (S30).

After the provision of an ECG service is activated, the latest ECG scenario which is associated with a selected/designated program is acquired from the ECG server 200 (S32). After the ECG scenario is acquired, an ECG scenario related to the program is executed according to the metadata shown in FIGS. 7 to 9, for example.

For instance, if an ECG scenario is composed only of an ECG scenario related to a program, program information and service provision information which constitute the ECG scenario are sequentially displayed in units of ECG sets according to the priorities that are set thereto (S34). After the display of all the ECG sets which constitute the ECG scenario is completed (S38), the display of the ECG scenario is repeated according to the priorities (S40).

To each piece of ECG data which is contained in the ECG set, a provision period (provision start date and time/provision end date and time) is settable. In the case of setting a provision period, ECG data to which a provision period corresponding to actual provision date and time is set is selected and displayed. Besides setting a provision period to each ECG data which is contained in the ECG set, setting may be made to change the content of provided ECG data according to the date and time, the time period or the number of times to playback a recorded program video. Further, a program genre, performer, product or the like in which a user is interested may be previously registered as preference information of the user, and ECG data in conformity with the preference information of the user may be provided.

If a user finds interested information in the displayed program information and service provision information, the user performs determination operation (S36). When the determination operation is performed, the processing for the display of the detail information concerning the program information and the service provision information or the provision of services concerning the service provision information is performed according to the program information and the service provision information which are displayed at the time when the determination operation is performed (S42). In the processing of the program information and the service provision information (S42), appropriate operation information may be generated and displayed according to function information which specifies the function of the receiving terminal 100.

During the execution of an ECG scenario, if an interrupt event such as remote control operation not related to the execution of the ECG scenario or update/change of program listing information occurs (S44), the execution of the ECG scenario is terminated or suspended (S46), and the interrupt event is executed (S48).

(Specific Description of ECG Scenario Providing Method)

A method of providing an ECG scenario that includes an ECG scenario related to a chapter video, a digest video or an edited video of a recorded program, which is characteristic to this embodiment, is described hereinafter using specific examples.

FIG. 13 is an explanatory view showing an example of a selection menu which is displayed during playback of a recorded program. In the selection menu shown in FIG. 13, a recorded program selection frame 902, a recorded and edited video selection frame 904, a chapter/digest video selection frame 906 and a processing operation selecting frame 908 are displayed.

The recorded program selection frame 902 is a frame for selecting a recorded program, and the recording date of a program, the list of selectable recorded programs and the name of a selected recorded program are displayed therein. On the recorded program selection frame 902, a user can select a desired recording date from the list of recording date which is displayed in a pull-down menu and select a desired recorded program from the list of relevant recorded programs, for example. In the example of FIG. 13, "program A" (professional style) which is recorded on "2007/7/10" is selected by a selection frame 903. In the case where a program video is recorded not in a program unit, information which can specify a recorded program video, such as a recording channel and recording date and time, may be displayed instead of the name of a recorded program.

The recorded and edited video selection frame 904 is a frame for selecting a recorded and edited video which is edited by a user, and the list of selectable recorded and edited videos is displayed therein. For a recorded and edited video, in addition to a program video after editing, recording and editing information which contains a recording channel and recording date and time for each program video before editing is stored in a storage portion of the receiving terminal 100 or the like and read according to need. On the recorded and edited video selection frame 904, a user can select a desired recorded and edited video from the list of recorded and edited videos. If the entire list of recorded and edited videos is not displayed within the frame, the display can be changed by manipulating a scroll bar. A name for specifying a recorded and edited video may be a name which is automatically assigned upon editing, a name which is arbitrarily set by a user or the like, for example.

The chapter/digest video selection frame 906 is a frame for selecting a chapter/digest video of a program to be played back, and the list of selectable videos and the name of a selected video are displayed therein. On the chapter/digest video selection frame 906, a user can select a desired video from the list of chapter/digest videos of a program to be played back. By selecting a desired video, the execution of an ECG scenario related to the selected video is selected. In the example of FIG. 13, "digest 1" (a scene where a performer A appears) is selected by a selection frame 907.

On the selection menu, if a user selects a desired recorded program and presses a playback button 909 in the processing operation selecting frame 908, for example, the user can browse an ECG scenario related to the selected recorded program while playing back the recorded program. Alternatively, a user can select a desired recorded program and then select a chapter video or a digest video of the selected recorded program and press the playback button 909. An ECG scenario related to the selected chapter video or digest video (e.g. an ECG scenario as shown in FIG. 14 described later) is thereby displayed while playing back the chapter video or digest video. This is the same when selecting a recorded and edited video instead of a recorded program. A detailed method for the playback of a recorded program video and the display of an ECG scenario is described later.

FIG. 14A is an explanatory view showing an example of the structure of ECG data which is contained in an ECG scenario related to a chapter video of a program. FIG. 14B is an explanatory view showing an example of the structure of ECG data which is contained in an ECG scenario related to a digest video. As shown in FIGS. 14A and 14B, ECG scenarios related to a chapter video and a digest video have the structure that is similar to the ECG scenario related to a program shown in FIG. 6.

FIG. 14A shows ECG scenarios related to "chapter 1" to "chapter 3", and FIG. 14B shows ECG scenarios related to "digest 1" to "digest 3", each related to a program A. In the ECG scenarios shown in FIGS. 14A and 14B, the ECG scenarios include program information "scene A", "scene B" and "program introduction", and "scenes where the performer A appears", "scenes where the performer B appears" and "program introduction", respectively. To each program information, service provision information such as "DVD", "book" and "goods" are associated. Thus, an ECG set is formed as a combination of program information and service provision information in this case. The ECG scenarios related to "chapter 1" and "digest 1" shown in FIGS. 14A and 14B are defined by the metadata as shown in FIGS. 9A to 9D, for example.

FIGS. 15 to 17 are explanatory views showing examples of the structures of ECG scenarios which are related to a chapter video, a digest video and an edited video.

FIG. 15 shows the structure of an ECG scenario related to a chapter video. Referring to FIG. 15, a recorded program A contains program videos which constitute chapter videos 1 to 3. For example, an ECG scenario related to the chapter video 2 contains ECG sets 1 and 2 which are composed of ECG data A-2, and the ECG scenario (ECG scenario definition information) contains information about the scheduled time (tc20, tc21) of the program video which constitutes the chapter video 2. If the playback of the chapter video 2 is selected, the ECG data A-2 related to the chapter video 2 is displayed in synchronization with the playback of the program video which constitutes the chapter video 2 based on the information about the scheduled time of the program video.

FIG. 16 shows the structure of an ECG scenario related to a digest video. Referring to FIG. 16, a recorded program B contains program videos D1 to D4 which constitute a digest video 1. For example, an ECG scenario related to the digest video 1 contains ECG sets 1 and 2 which are composed of ECG data B-D1, and the ECG scenario (ECG scenario definition information) contains information about the scheduled time (td10, td11, td20, td21, td30, td31, td40, td41) of the program videos D1 to D4 which constitute the digest video 1. If the playback of the digest video 1 is selected, the ECG data B-D1 related to the digest video 1 is displayed in synchronization with the playback of the program videos D1 to D4 which constitute the digest video 1 based on the information about the scheduled time of each program video.

FIG. 17 shows the structure of an ECG scenario related to a recorded and edited video. Referring to FIG. 17, a recorded and edited video W contains program videos W1-2, W2-4 and W3-3 which respectively constitute a segment 2 of a program W1, a segment 4 of a program W2 and a segment 3 of a program W3. For example, an ECG scenario related to the program video W1-2 of the recorded and edited video W contains ECG sets 1 and 2 which are composed of ECG data W1-2, and the ECG scenario (ECG scenario definition information) contains information about the scheduled time (tw10, tw11) of the program video W1-2. If the playback of the program video W1-2 is selected, the ECG data W1-2 related to the program video W1-2 is displayed in synchronization with the playback of the program video W1-2 based on the information about the scheduled time. This is the same for the playback of the program video W2-4 and W3-3.

Figure 19:
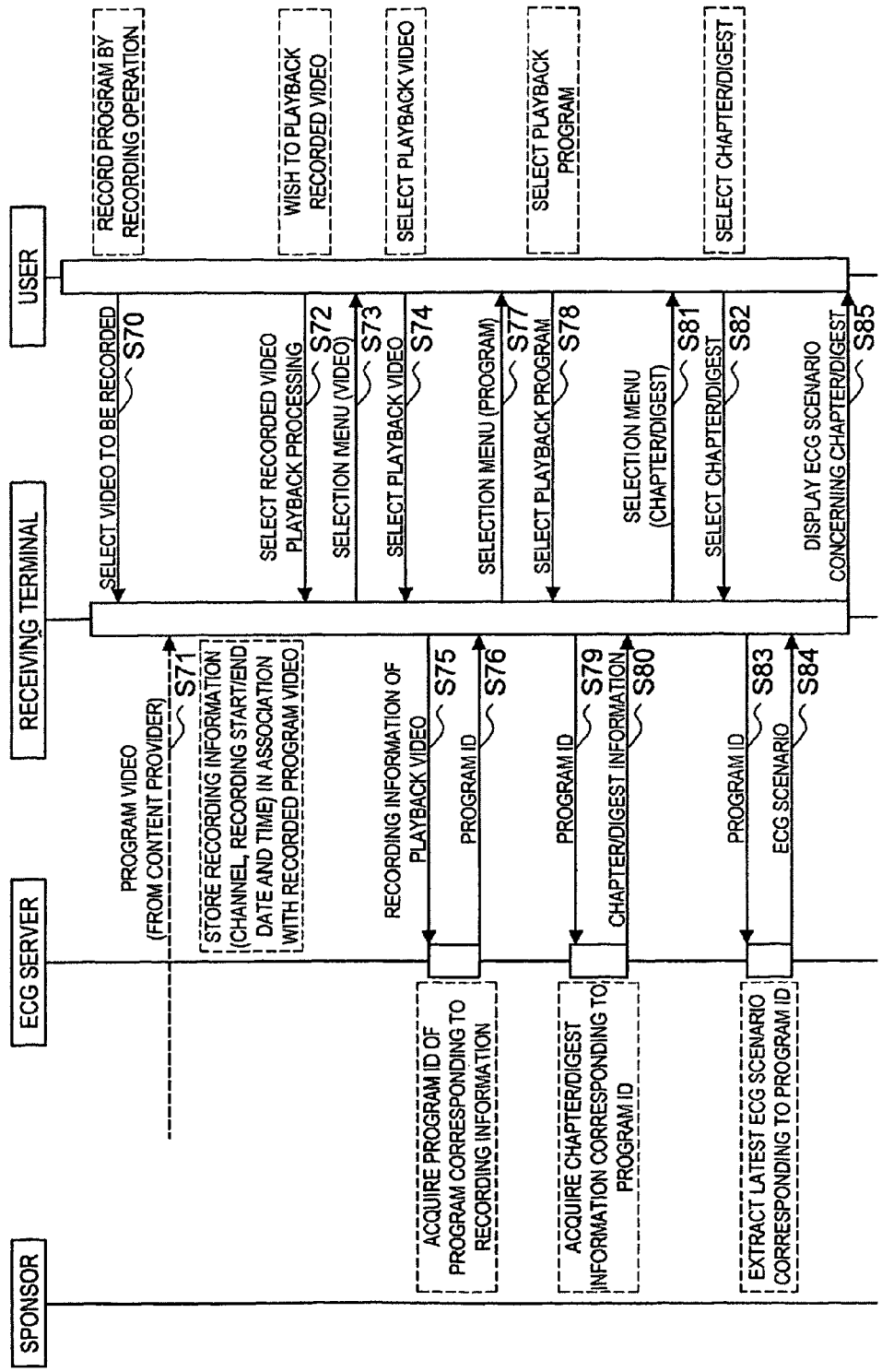
FIG. 19 is an explanatory view showing an example of a process flow of an ECG scenario in an entire information providing system (in the case of recording in a unit different from a program unit).

FIGS. 18 and 19 are explanatory views showing an example of the process flow of an ECG scenario in an entire information providing system.

FIG. 18 shows the process flow of an ECG scenario in the case of recording a program video in a program unit using program listing information or the like, for example.

A user selects a program using program listing information or the like in order to reserve program recording (S50). In this case, a program video is recorded in a program unit. The receiving terminal 100 transmits designation information which designates a selected program to the ECG server 200 (S51). The ECG server 200 acquires the program ID which corresponds to the designation information using the database that stores designation information and a program ID in association with each other, for example, and transmits the acquired program ID to the receiving terminal 100 (S52). Designation information and a program ID are information which can identify a program, and they may be information including a unique identification number, identification symbol and so on, or information including a program provision channel, provision time and so on. The receiving terminal 100 receives the program ID, then receives video information of the selected program from the content provider 300 and records the video information (S53). The program ID is stored in a storage portion of the receiving terminal 100, for example, in association with the recorded program video.

A user selects playback of a recorded program (S54). The receiving terminal 100 displays a selection menu which includes the recorded program selection frame 902 as shown in FIG. 13, for example (S55) and prompts a user to perform selection of a recorded program to be played back.

A user selects a recorded program to be played back (S56). The receiving terminal 100 transmits the program ID which is stored in association with the selected program video to the ECG server 200 (S57). The ECG server 200 acquires chapter/digest information related to the program which is designated by the program ID as shown in FIG. 7A, for example, and transmits the acquired chapter/digest information to the receiving terminal 100 (S58). The receiving terminal 100 displays a selection menu which includes the chapter/digest video selection frame 906 as shown in FIG. 13, for example, based on the chapter/digest information (S59) and prompts a user to perform selection of a chapter/digest video.

A user selects a chapter/digest video to be played back (an ECG scenario related to a chapter/digest video to be browsed) (S60). The receiving terminal 100 transmits a program ID together with a request for transmitting an ECG scenario to the ECG server 200 (S61). The ECG server 200 extracts the latest ECG scenario which is stored in association with the program that is designated by the program ID and transmits the extracted ECG scenario to the receiving terminal 100 (S62). The receiving terminal 100 receives the ECG scenario and executes and displays the ECG scenario related to the relevant chapter/digest video in synchronization with the playback of the previously selected chapter/digest video based on the scheduled time of each program video which constitutes the chapter/digest video (S63).

If a user wishes to purchase a product which is included in the ECG scenario, the user selects product purchase processing (S64). The receiving terminal 100 requests the sponsor 400 serving as a sales agency to perform product purchase processing (S65) and acquires a result of the product purchase processing from the sponsor 400 (S66). The receiving terminal 100 transmits and receives information about a request for the product purchase processing and information about a result of the product purchase processing between the user and the sponsor 400 (S64 to S67). The product purchase processing is thereby performed between the user and the sponsor 400.

FIG. 19 shows the process flow of an ECG scenario in the case of recording a program video in a program unit or not in program unit without using program listing information or the like, for example.

In the process flow shown in FIG. 19, a user performs program recording without using program listing information or the like (S70). Thus, a program video is recorded in a unit different from a program unit in some cases. Although the case where a program video is recorded in a unit different from a program unit is described below, the same process flow is applicable to the case where it is recorded in a program unit as well.

In response to the instruction of program recording, the receiving terminal 100 receives video information of a program which is provided in the selected channel from the content provider 300 and records the video information (S71). Recording information (recording channel and recording start/end time) is stored in a storage portion of the receiving terminal 100, for example, in association with the recorded program video.

A user selects playback of a program video (S72). The receiving terminal 100 displays a selection menu which includes the recorded program selection frame 902 as shown in FIG. 13, for example (S73) and prompts a user to perform selection of a recorded program to be played back. In the recorded program selection frame 902, information which can identify a recorded program video such as a recording channel and recording date and time is displayed.

A user selects a recorded program video to be played back (S74). The receiving terminal 100 transmits the recording information which is stored in association with the selected program video to the ECG server 200 (S75). The ECG server 200 acquires a program ID which corresponds to each of one or more programs which are specified by the recording information based on program listing information or the like and transmits the acquired program ID to the receiving terminal 100 (S76). The receiving terminal 100 displays a selection menu which includes the recorded program selection frame 902 as shown in FIG. 13, for example (S77) and prompts a user to perform selection of a recorded program to be played back.

The subsequent process flow (S78 to S85) is the same as the process flow (S56 to S63) shown in FIG. 18 and thus not repeatedly described herein.

Figure 20:
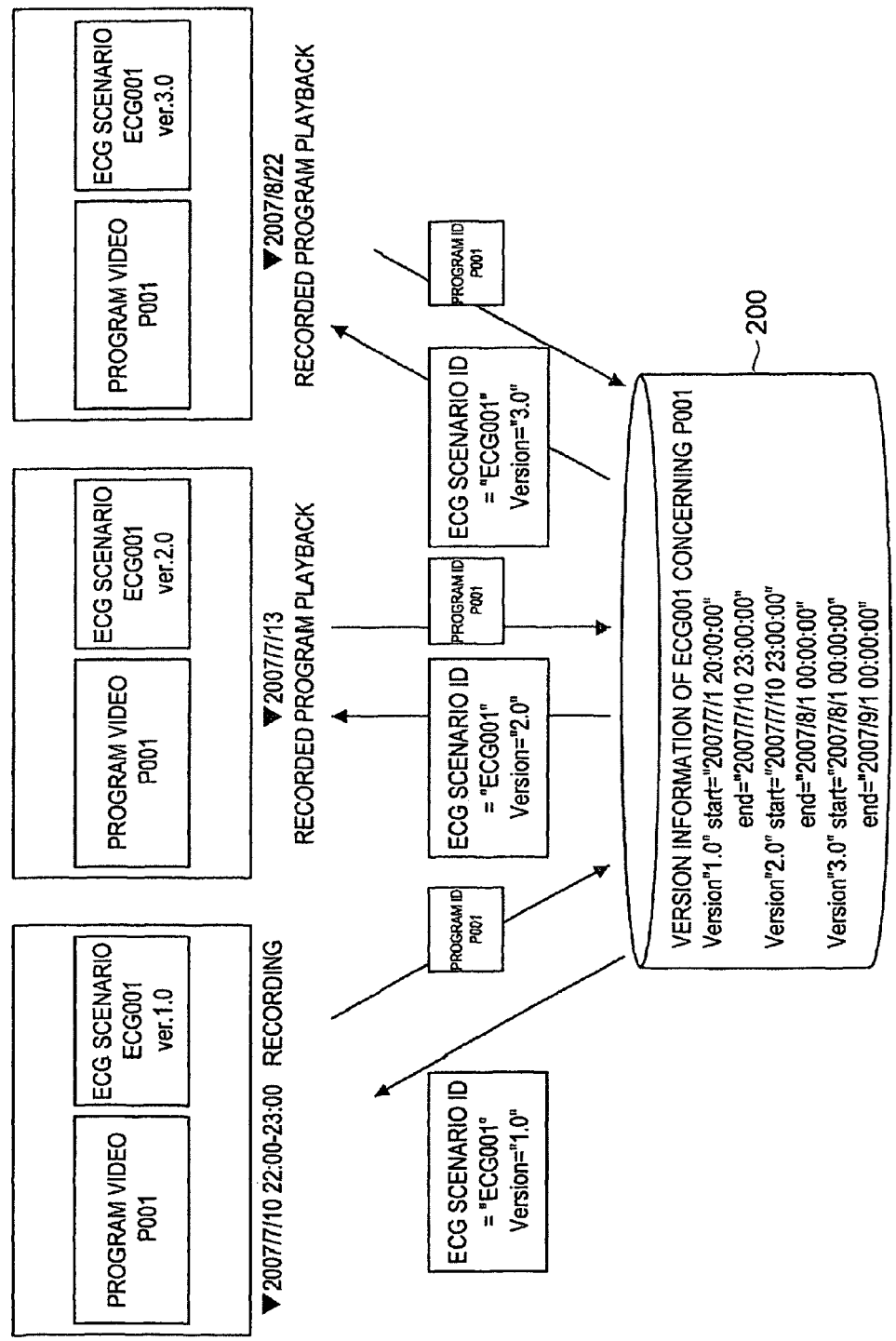
FIG. 20 is an explanatory view showing a method of providing a latest ECG scenario.

FIG. 20 is an explanatory view showing a provision method of a latest ECG scenario.

FIG. 20 illustrates the case of providing an ECG scenario "ECG 001" which is associated with a program to which a program ID "P001" is assigned. When a program video is recorded from 22:00 to 23:00 on 7/10, the program ID "P001" is stored in the receiving terminal 100 in association with the program video.

An ECG scenario may be provided in association with a program ID or the like, for example, as an ECG scenario in each version to which a provision period (valid period) is set by the ECG server 200. The following description is based on the assumption that an ECG scenario in a first version (provision period: 20:00 on 7/1 to 23:00 on 7/10), a second version (provision period: 23:00 on 7/10 to 00:00 on 8/1) and a third version (provision period: 00:00 on 8/1 to 00:00 on 9/1) is provided, for example.

For example, when browsing the ECG scenario at 00:00 on 7/10, the ECG scenario in the first version "1.0", to which the relevant provision period (20:00 on 7/1 to 23:00 on 7/10) is set, is provided to the receiving terminal 100. Because a chapter video and a digest video of a program are provided after the end of provision of the program, the ECG scenario in the first version "1.0" does not correspond to a chapter video and a digest video. When playing back a recorded program on 7/13, if the program ID "P001" is transmitted to the ECG server 200, the ECG scenario in the second version "2.0", to which the relevant provision period (23:00 on 7/10 to 00:00 on 8/1) is set, is provided to the receiving terminal 100. This is the same for the provision of the ECG scenario in the third version. It is thereby possible to provide the latest ECG scenario to the receiving terminal 100 according to the time point when the ECG scenario is browsed.

Figure 21:
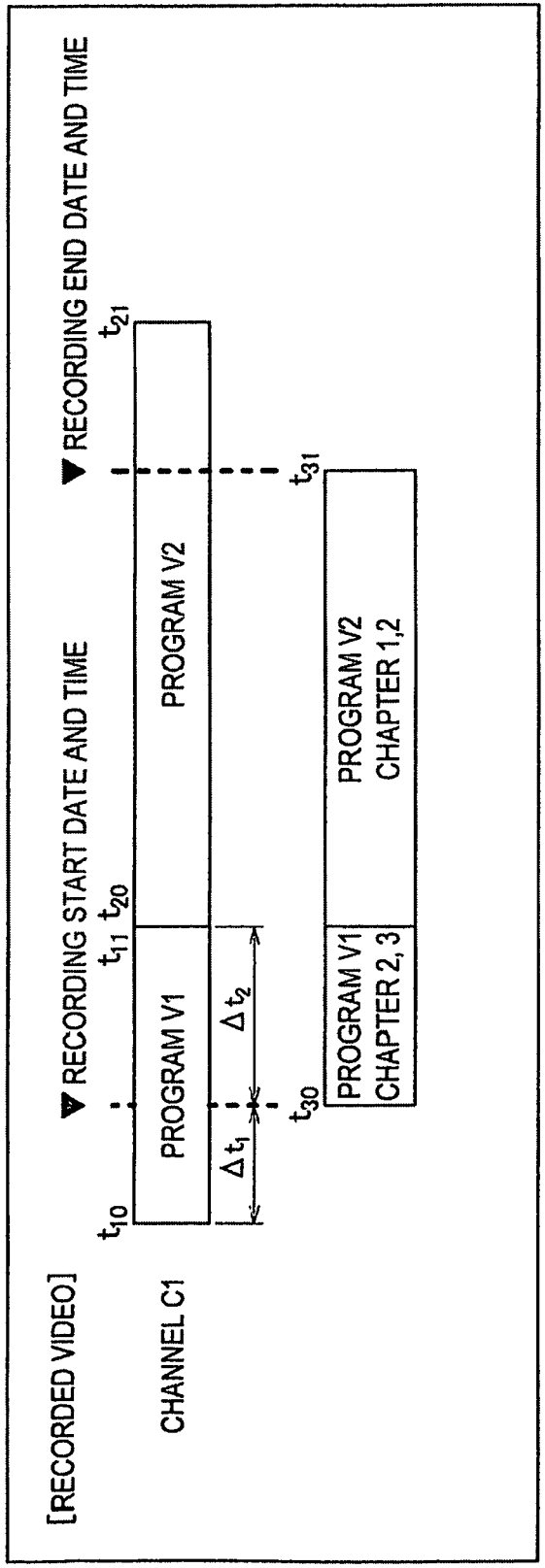
FIG. 21 is an explanatory view showing a method of synchronizing playback of a program video with display of an ECG scenario (in the case where a program video is recorded in a unit different from a program unit).

FIGS. 21 and 22 are explanatory views showing a method of synchronizing playback of a program video with display of an ECG scenario.

FIG. 21 shows a method of establishing synchronization between a program video and an ECG scenario in the case where the program video is recorded in a unit different from a program unit.

In the example of FIG. 21, a program V1 is provided from a provision time t10 to t11, and a program V2 is provided from a provision time t20 to t21 in a channel C1. A part of the program videos of the programs V1 and V2 is recorded for a recording time t30 to t31 and, as a result, a program video which contains program videos corresponding to chapters 2 and 3 of the program V1 and chapters 1 and 2 of the program V2 is recorded.

The receiving terminal 100 stores the recording channel (C1) and the recording time (t30 to t31) as recording information in association with the recorded program video. When playing back the program video, the receiving terminal 100 transmits the recording information to the ECG server 200 and acquires the program ID of one or more programs (V1 and V2) which correspond to the recording information.

If the recorded program to be played back is selected based on the program ID, the receiving terminal 100 transmits the program ID of the selected recorded program to the ECG server 200. The ECG server 200 determines whether an ECG scenario related to a chapter video and/or a digest video is selectable based on the program which corresponds to the program ID. If it is selectable, the ECG server 200 transmits the list of ECG scenarios related to the chapter video and/or the digest video to the receiving terminal 100.

Receiving the list of videos, the receiving terminal 100 determines whether each of the chapter videos and/or the digest videos which are included in the list is composed only of the recorded program video (which correspond to at least one of the chapters 2 and 3 of the program V1 and the chapters 1 and 2 of the program V2, for example). This is because an ECG scenario related to the chapter video and/or the digest video which contains a program video that is not recorded cannot be played back in a chapter video and/or a digest video unit. After the determination about the list of videos ends, the receiving terminal 100 provides the list of ECG scenarios related to the chapter video and/or the digest video which is composed only of the recorded program video as the list of selectable videos to a user.

If the playback of one chapter video or digest video is selected by a user, the receiving terminal 100 acquires the ECG scenario which is associated with the program corresponding to the program ID from the ECG server 200. When playing back the program video, the receiving terminal 100 displays the ECG scenario related to the chapter/digest video in synchronization with the playback of the program video by referring to the chapter information or the digest information contained in the ECG scenario (ECG scenario definition information) and the prestored recording information. If the playback of a program video is selected without designation of any chapter video or digest video, the ECG scenario related to the program is displayed.

For example, when playing back the chapter video 2 of the program V1, the receiving terminal 100 refers to the scheduled time of the program video which constitutes the chapter video 2 and the provision start time (t10) of the program based on the chapter information and refers to the recording start time (t30) based on the recording information. The scheduled time of the program video is represented as the relative time from the provision start time (t10) of the program (cf. FIG. 7A). The recording start time (t30) is later than the provision start time (t10) of the program V1 by Δt1 (=t30-t10). Therefore, if the scheduled time of the program video which constitutes the chapter video 2 of the program V1 (the time period from the provision start time of the program V1 to the start time of the program video) is 30 minutes and Δt1 is 20 minutes, for example, the display of the ECG scenario related to the chapter video 2 is started at the time point when the program video has been played back for 10 minutes from the recording start time.

For another example, when playing back the chapter video 1 of the program V2, the receiving terminal 100 refers to the scheduled time of the program video which constitutes the chapter video 1 based on the chapter information and refers to the recording start time (t30) based on the recording information. The recording start time (t30) is earlier than the provision start time (t20) of the program V2 by Δt2 (=t20-t30). Therefore, if the scheduled time of the program video which constitutes the chapter video 1 of the program V2 (the time period from the provision start time of the program V2 to the start time of the program video) is 30 minutes and Δt2 is 20 minutes, for example, the display of the ECG scenario related to the chapter video 1 is started at the time point when the program video has been played back for 50 minutes from the recording start time.

FIG. 22 shows a method of synchronizing playback of a program video with display of an ECG scenario (in the case where a recorded video is edited).

In the example of FIG. 22, a chapter 2 of a program W1 in a channel C1, a chapter 4 of a program W2 in a channel C2 and a chapter 3 of a program W3 in a channel C3, which are recorded separately, are edited as one recorded and edited video.

The receiving terminal 100 stores the recording channels (C1, C2 and C3) and the recording time (t41 to t42, t51 to t52 and t61 to t62) as recording and editing information in association with each program video which is recorded and edited. When playing back the recorded and edited video, the receiving terminal 100 transmits the recording and editing information to the ECG server 200 and acquires the program ID of one or more programs (W1, W2 and W3) which correspond to the recording and editing information.

The selection of a recorded program and the selection of an ECG scenario related to a chapter video or a digest video are the same as those of the case shown in FIG. 21 and thus not repeatedly described in detail herein.

When a recorded program to be played back is selected, if an ECG scenario related to a chapter video and/or a digest video of the selected program is selectable, an ECG scenario related to the chapter video or the digest video is displayed while playing back the program video which constitutes the chapter video or the digest video in the recorded program video. If the playback of a program video is selected without designation of any chapter video or the digest video, an ECG scenario related to the program is displayed.

For example, when playing back the chapter video 2 of the program W1, the receiving terminal 100 refers to the chapter information and the recording and editing information just like the case shown in FIG. 21. The recording start time (t41) of the chapter video 2 of the program W1 is later than the provision start time (t40) of the program W1 by Δt4 (=t41-t40). Therefore, the display of the ECG scenario related to the chapter video 2 is started at the timing that is earlier than the scheduled time of the program video which constitutes the chapter video 2 of the program W1 (the time period from the provision start time of the program W1 to the start time of the program video) by Δt4 (=t41-t40).

When playing back the chapter video 4 of the program W2, the receiving terminal 100 refers to the chapter information and the recording and editing information just like the case shown in FIG. 21. The recording start time (t51) of the chapter video 4 of the program W2 is later than the provision start time (t50) of the program W2 by Δt5 (=t51-t50). Therefore, the display of the ECG scenario related to the chapter video 4 is started at the timing that is earlier than the scheduled time of the program video which constitutes the chapter video 4 by (=Δt5-Δt4') in consideration of the scheduled time of the program video which constitutes the chapter video 4 of the program W2 (the time period from the provision start time of the program W2 to the start time of the program video) and the recording period Δt4' (=t42-t41) of the chapter video 2 of the program W1.

As described in the foregoing, in the information providing system according to this embodiment, the ECG server 200 stores related information constituting a program and a scheduled time of each program video in association with a program. The receiving terminal 100 transmits designation information which designates a program that contains a specific recorded program video to the ECG server 200. The ECG server 200 receives the designation information from the receiving terminal 100, extracts a related information related to the designated program and transmits the extracted related information to the receiving terminal 100. The receiving terminal 100 receives the related information related to the designated program from the ECG server 200 and controls the display of the ECG scenario related to the specific program video in synchronization with the playback of the specific program video based on the related information, thereby providing the information related to the specific program video which constitutes the recorded program.

It should be understood by those skilled in the art that various modifications, combinations, sub-combinations and alterations may occur depending on design requirements and other factors insofar as they are within the scope of the appended claims or the equivalents thereof.

For example, although the case of playing back a recorded program video is described in the above embodiment, the present invention is also applicable to the case of playing back a content video which is distributed in VOD format or the like, for example. In such a case, an information providing apparatus stores related information which contains scenario information related to each content video constituting a content and a scheduled time of each content video in association with the content. Then, a video playback apparatus transmits designation information which designates a content that contains a content video to be viewed to the information providing apparatus. The information related to a specific content video which constitutes a distributed content is thereby provided.

Further, although the case where a related information is stored in the ECG server 200 (information providing apparatus) is described in the above embodiment, a related information may be stored in an external storage device or the like which is connected to the ECG server 200.

Furthermore, although the case where the receiving terminal 100 (video playback apparatus) has a recording and playback function is described in the above embodiment, the recording function and/or the playback function may be provided in an external device or the like which is connected to the receiving terminal 100.

What is claimed is:
1. A video playback apparatus for playing back a recorded program video, connected with an information providing apparatus for providing information related to a program through a communication network, comprising:
- a designation information transmitting portion to transmit designation information designating a program containing a specific recorded program video to the information providing apparatus;
- a related information receiving portion to receive the related information associated with the designated program, selected from related information containing scenario information related to each program video constituting a program and a scheduled time of each program video and stored in association with the program in the information providing apparatus, from the information providing apparatus, the scenario information comprising program information related to the designated program, service provision information related to the designated program, and association information which establishes association between the designated program, the program information, and the service provision information; and
- a display/playback control portion to control display of the scenario information related to the specific program video in synchronization with playback of the specific program video based on the scheduled time of the program video contained in the related information, wherein
- the designation information transmitting portion transmits recording information regarding a recording channel and a recording time of a recorded program video to the information providing apparatus, and transmits designation information designating a program selected from one or more programs specified as a program containing at least part of a recorded program video by the information providing apparatus based on the recording information to the information providing apparatus.

2. The video playback apparatus according to claim 1, wherein
one or more program video constituting a program is edited as a chapter video and/or a digest video of the program, and related information containing scenario information related to each chapter video and/or each digest video and a scheduled time of each program video edited as each chapter video and/or each digest video is stored in association with the program in the information providing apparatus, and
the display/playback control portion controls display of the scenario information related to a specific chapter video and/or a specific digest video in synchronization with playback of each program video edited as the specific chapter video and/or the specific digest video based on the scheduled time of each program video contained in the related information.

3. The video playback apparatus according to claim 2, wherein
selectability of the chapter video and/or the digest video composed of a recorded program video is determined based on a relationship between the scheduled time of each program video constituting the chapter video and/or the digest video and a recording time of a recorded program video, and
the video playback apparatus further includes a playback video selecting portion to select one from the chapter video and/or the digest video determined to be selectable.

4. The video playback apparatus according to claim 1, wherein
the designation information transmitting editing information regarding a recording channel and a recording time of each edited program video to the information providing apparatus, and transmits designation information designating a program selected from one or more programs specified as a program containing at least part of a edited program video by the information providing apparatus based on the editing information to the information providing apparatus.

5. The video playback apparatus according to claim 1, wherein
a plurality of pieces of related information with different generation date and time or update date and time are stored in association with a program in the information providing apparatus, and
the related information receiving portion receives the related information with latest generation date and time or update date and time concerning a designated program from the information providing apparatus.

6. The video playback apparatus according to claim 1, wherein
the related information contains one or more scenario information in a scenario form so as to sequentially display a plurality of pieces of information related to a program video.

7. An information providing apparatus for providing information related to a program, connected with a video playback apparatus for playing back a recorded program video through a communication network, comprising:
- a related information storage portion to store related information containing scenario information related to each program video constituting a program and a scheduled time of each program video in association with the program, the scenario information comprising program information related to the program, service provision information related to the program, and association information which establishes association between the program, the program information, and the service provision information;
- a designation information receiving portion to receive designation information designating a program containing a specific recorded program video from the video playback apparatus;
- a related information extracting portion to extract the related information associated with the designated program from the related information storage portion; and
- a related information transmitting portion to transmit the extracted related information to the video playback apparatus so that the video playback apparatus controls display of the scenario information related to the specific program video in synchronization with playback of the specific program video based on the scheduled time of the program video contained in the related information, wherein
- the related information transmitting portion transmits the related information related to a designated program selected from programs specified as a program containing at least part of a recorded program video based on recording information regarding a recording channel and a recording time of a recorded program video to the video playback apparatus.

8. The information providing apparatus according to claim 7, wherein
one or more program video constituting a program is edited as a chapter video and/or a digest video of the program, the related information storage portion stores related information containing scenario information related to each chapter video and/or each digest video and a scheduled time of each program video edited as each chapter video and/or each digest video in association with the program, and the related information transmitting portion transmits the extracted related information to the video playback apparatus so that the video playback apparatus controls display of the scenario information related to a specific chapter video and/or a specific digest video in synchronization with playback of each program video edited as the specific chapter video and/or the specific digest video based on the scheduled time of each program video contained in the related information.

9. The information providing apparatus according to claim 8, wherein the related information transmitting portion transmits information for selecting one from the chapter video and/or the digest video contained in the related information related to a designated program to the video playback apparatus.

10. The information providing apparatus according to claim 7, wherein the related information transmitting portion transmits the related information related to a designated program selected from programs specified as a program containing at least part of an edited program video based on editing information regarding a recording channel and a recording time of each edited program video to the video playback apparatus.

11. The information providing apparatus according to claim 7, wherein the related information storage portion stores a plurality of pieces of related information with different generation date and time or update date and time in association with a program, and the related information transmitting portion transmits the related information with latest generation date and time or update date and time concerning a designated program to the video playback apparatus.

12. The information providing apparatus according to claim 7, wherein the related information contains one or more scenario information in a scenario form so as to sequentially display a plurality of pieces of information related to a program video.

13. An information providing system where a video playback apparatus for playing back a recorded program video and an information providing apparatus for providing information related to a program are connected through a communication network, wherein the video playback apparatus includes:
a designation information transmitting portion to transmit designation information designating a program containing a specific recorded program video to the information providing apparatus;
a related information receiving portion to receive related information associated with the designated program from the information providing apparatus; and
a display/playback control portion to control display of scenario information related to the specific program video in synchronization with playback of the specific program video based on a scheduled time of the program video contained in the related information, the scenario information comprising program information related to the designated program, service provision information related to the designated program, and association information which establishes association between the designated program, the program information, and the service provision information, and the information providing apparatus includes:
a related information storage portion to store the related information containing the scenario information related to each program video constituting a program and the scheduled time of each program video in association with the program;
a designation information receiving portion to receive the designation information from the video playback apparatus;
a related information extracting portion to extract the related information associated with the designated program from the related information storage portion; and
a related information transmitting portion to transmit the extracted related information to the video playback apparatus, wherein
the designation information transmitting portion transmits recording information regarding a recording channel and a recording time of a recorded program video to the information providing apparatus, and transmits designation information designating a program selected from one or more programs specified as a program containing at least part of a recorded program video by the information providing apparatus based on the recording information to the information providing apparatus.

14. An information providing method applied to an information providing system where a video playback apparatus for playing back a recorded program video and an information providing apparatus for providing information related to a program are connected through a communication network, comprising the steps of:

storing related information containing scenario information related to each program video constituting a program and a scheduled time of each program video in association with the program in the information providing apparatus, the scenario information comprising program information related to the program, service provision information related to the program, and association information which establishes association between the program, the program information, and the service provision information;

extracting the related information associated with a program designated by the video playback apparatus and containing a specific recorded program video in the information providing apparatus;

transmitting the extracted related information to the video playback apparatus from the information providing apparatus;

receiving the related information associated with the designated program from the information providing apparatus by the video playback apparatus; and controlling display of the scenario information related to the specific program video in synchronization with playback of the specific program video based on the scheduled time of the program video contained in the related information by the video playback apparatus, wherein transmitting further comprises transmitting recording information regarding a recording channel and a recording time of a recorded program video to the information providing apparatus, and transmitting designation information designating a program selected from one or more programs specified as a program containing at least part of a recorded program video by the information providing apparatus based on the recording information to the information providing apparatus.

15. A non-transitory computer-readable medium comprising a program applied to a video playback apparatus included in an information providing system where the video playback apparatus for playing back a recorded program video and an information providing apparatus for providing information related to a program are connected through a communication network, the program causing a computer to implement functions comprising:
   a designation information transmitting means to transmit designation information designating a program containing a program video to be played back to the information providing apparatus;
   a related information receiving means to receive the related information associated with the designated program, selected from related information containing scenario information related to each program video constituting a program and a scheduled time of each program video and stored in association with the program, from the information providing apparatus, the scenario information comprising program information related to the designated program, service provision information related to the designated program, and association information which establishes association between the designated program, the program information, and the service provision information; and
   a display/playback control means to control display of scenario information related to the specific program video in synchronization with playback of the specific program video based on the scheduled time of the program video contained in the related information, wherein
   the designation information transmitting means transmits recording information regarding a recording channel and a recording time of a recorded program video to the information providing apparatus, and transmits designation information designating a program selected from one or more programs specified as a program containing at least part of a recorded program video by the information providing apparatus based on the recording information to the information providing apparatus.

16. A non-transitory computer-readable medium comprising a program applied to an information providing apparatus included in an information providing system where a video playback apparatus for playing back a recorded program video and the information providing apparatus for providing information related to a program are connected through a communication network, the program causing a computer to implement functions comprising:
   a related information storage means to store related information containing scenario information related to each program video constituting a program and a scheduled time of each program video in association with the program, the scenario information comprising program information related to the program, service provision information related to the program, and association information which establishes association between the program, the program information, and the service provision information;
   a designation information receiving means to receive designation information designating a program containing a specific recorded program video from the video playback apparatus;
   a related information extracting means to extract the related information associated with the designated program from the related information storage means; and
   a related information transmitting means to transmit the extracted related information to the video playback apparatus so that the video playback apparatus controls display of the scenario information related to the specific program video in synchronization with playback of the specific program video based on the scheduled time of the program video contained in the related information, wherein
   the related information transmitting means transmits the related information related to a designated program selected from programs specified as a program containing at least part of a recorded program video based on recording information regarding a recording channel and a recording time of a recorded program video to the video playback apparatus.

* * * * *